(12) United States Patent
Mori

(10) Patent No.: US 8,564,810 B2
(45) Date of Patent: Oct. 22, 2013

(54) JOB MANAGEMENT APPARATUS, JOB MANAGEMENT METHOD, AND STORAGE MEDIUM FOR USING INFORMATION OF A POST-PROCESSING APPARATUS TO MANAGE A PRINT JOB

(75) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 12/437,415

(22) Filed: May 7, 2009

(65) Prior Publication Data
US 2009/0279137 A1 Nov. 12, 2009

(30) Foreign Application Priority Data
May 9, 2008 (JP) ................................. 2008-123896

(51) Int. Cl.
*G06F 3/12* (2006.01)
(52) U.S. Cl.
USPC ....... 358/1.15; 358/1.13; 358/1.14; 358/1.16; 358/1.18; 358/538
(58) Field of Classification Search
None
See application file for complete search history.

(56) References Cited

U.S. PATENT DOCUMENTS

2006/0232818 A1* 10/2006 Hino et al. ................... 358/1.15
2006/0238777 A1  10/2006 Anno et al.
2009/0251721 A1* 10/2009 Knodt et al. ................. 358/1.15

FOREIGN PATENT DOCUMENTS

| JP | 2003219105 A | 7/2003 |
|---|---|---|
| JP | 2006232501 A | 9/2006 |
| JP | 2006-308692 A | 11/2006 |
| JP | 2006301742 A | 11/2006 |
| JP | 2006308692 A | 11/2006 |
| JP | 2006323501 A | 11/2006 |

* cited by examiner

*Primary Examiner* — Paul F Payer
(74) *Attorney, Agent, or Firm* — Canon USA, Inc., I.P. Division

(57) ABSTRACT

An MIS server sends, to a color MFP, a job ticket including information of post-processing apparatuses (in single or combined use), which have abilities to execute post-processing instructed by a print job, along with print contents data. Accordingly, even when the other post-processing apparatus than the apparatus that has been initially scheduled by the operator to be used is actually used, the job ticket needs to be not output again. Therefore, time and efforts required for the operator can be reduced.

8 Claims, 21 Drawing Sheets

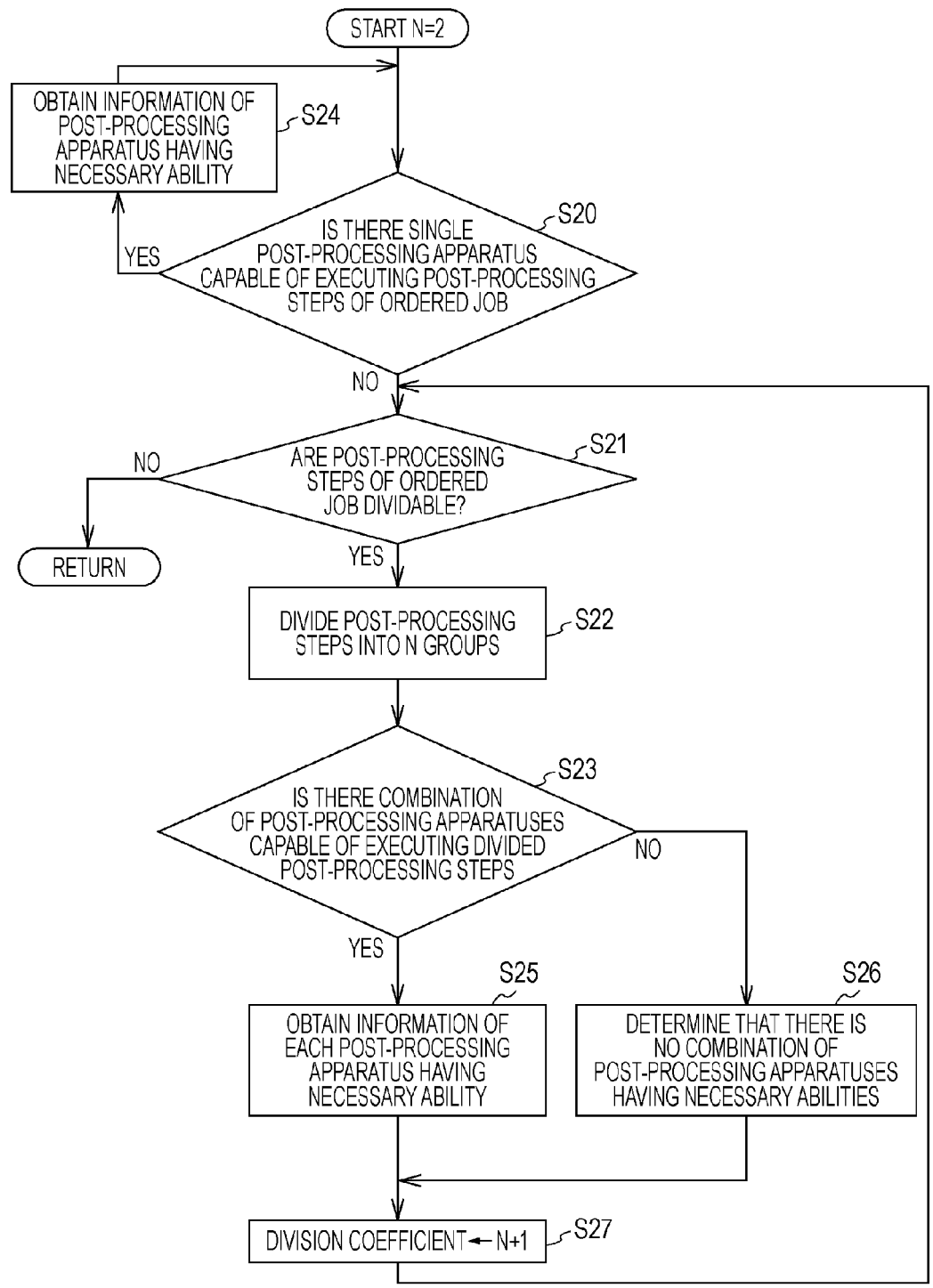

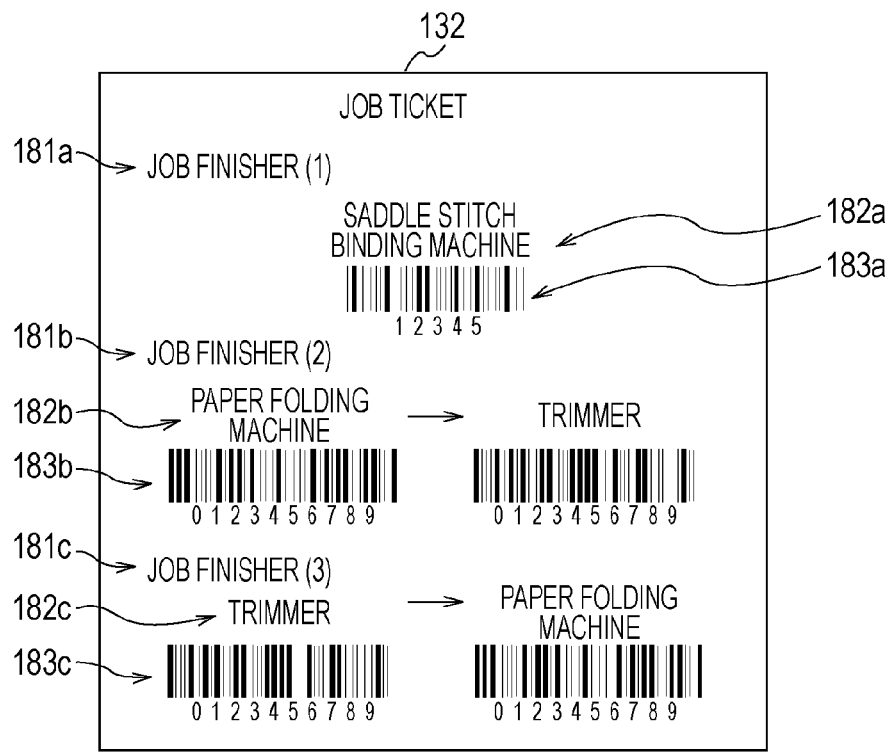

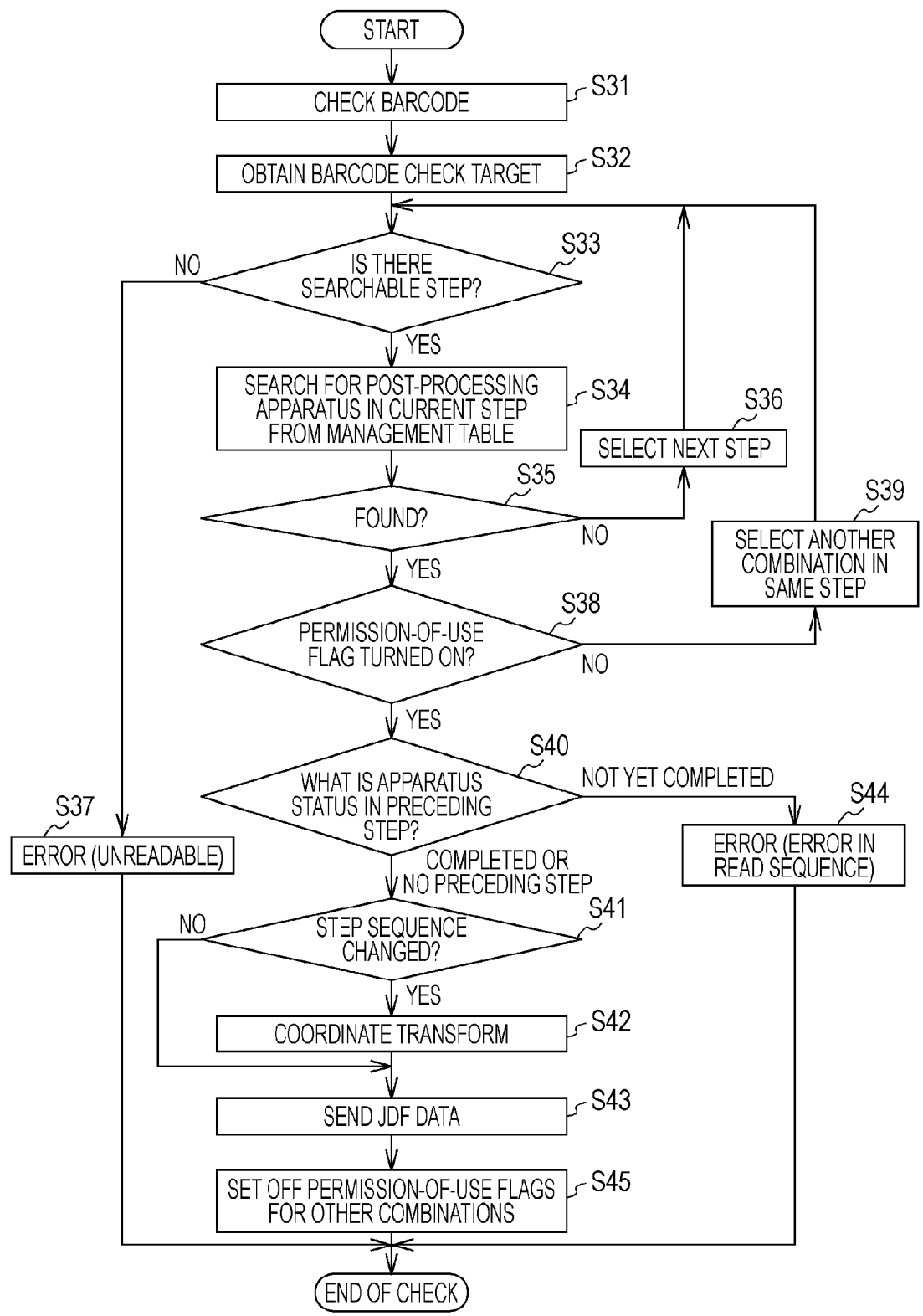

JOB MANAGEMENT APPARATUS, JOB MANAGEMENT METHOD, AND STORAGE MEDIUM FOR USING INFORMATION OF A POST-PROCESSING APPARATUS TO MANAGE A PRINT JOB

BACKGROUND OF THE INVENTION

1. Field of the Invention

The present invention relates to a job management apparatus, a job management method, and a storage medium storing a computer program. More particularly, the present invention is suitably used to perform post-processing (i.e., post-press processing or finishing) on prints.

2. Description of the Related Art

A large-scale printing machine, such as an offset plate-making and printing press, is mainly employed even at present in the so-called commercial printing business where a printing company receives a request for producing prints from a client, produces the requested prints, and obtains a reward from the client after delivery of the prints. In such printing business, an ordered job is progressed through various steps of, for example, receiving a manuscript, working out a design and layout, producing a comprehensive layout (i.e., presentation with a printer output), proofreading (including layout revision and color revision), proof-printing, producing layout paper (mechanical), printing, executing post-processing (i.e., post-press processing or finishing), and dispatching.

Producing layout paper is indispensable to obtain prints by utilizing the offset plate-making and printing press. However, once the layout paper is produced, it is not easy to revise the layout paper, and the revision is disadvantageous from the viewpoint of cost. For that reason, careful proofreading, i.e., checking of the layout and confirmation of colors, is essential. Thus, in the commercial printing business, the job needs to be progressed in sequence through various steps. Stated another way, the commercial printing business requires not only the large-scale printing press, but also a certain period of time to produce prints demanded by the client. Further, individual tasks need respective expertise, i.e., know-how of skilled workers called craftsmen.

On the other hand, in competing with the above-described commercial printing business, a Print-On-Demand system (hereinafter referred to as a "POD" system) has recently been practiced with rapid development of electrophotographic printing apparatuses and ink jet printing apparatuses toward a higher speed and higher quality. The POD system is intended to handle a job in a smaller lot than the ordinary job, which has hitherto been handled by the offset plate-making and printing press, in a shorter delivery time without employing a large-scale apparatus or system. A new business market is now going to emerge in which digital printing using electronic data is implemented by making full use of a digital image processing apparatus, such as a digital copying machine or a digital composite machine, instead of a large-scale printing press or printing technique.

In such POD business, an entire system becomes more digitized and management and control using computers become more prevail than in the conventional printing business. Stated another way, the POD business is developed with intent to approach a level in the commercial printing business as much as possible by utilizing the computers. Against that background, a POD market is increasingly spreading in the form of copy/print shops, print services provided by printing companies, intra-company (in-house) print services, etc.

Further, finishing devices have been put into practical use as not only an inline finisher which is physically connected to an image processing apparatus, but also a near-line finisher. The near-line finisher is a finishing device which is physically away from an image processing apparatus, but which is connected to the image processing apparatus via a network in a way capable of communicating with each other.

In a system employing the near-line finisher, an instruction sheet on which a job (task) instruction for a next process is described (referred to as a "job ticket") is generally printed out along with prints at the same time. According to the general method, a job is provided in such a manner as preparing contents of a job ticket and outputting the job ticket to be positioned on prints. This enables a worker to carry the prints to a finishing device in accordance with the job instruction described on the job ticket.

Japanese Patent Laid-Open No. 2006-308692 proposes a technique in relation to the system employing the near-line finisher. According to the proposed technique, if an error occurs in a near-line finisher, a finishing device having the same function as the post-processing function, which has been scheduled to be executed by the relevant near-line finisher, is searched for. If such a finishing device is found through the search, a job ticket for the relevant finishing device is generated (issued) and sent to it.

With the proposed known technique, however, information output to the job ticket is limited to a particular job instruction. For example, if a finisher A becomes unusable because of a failure after the job ticket has been generated to instruct the use of the finisher A instead, a user cannot easily find another finisher as a next candidate.

Further, post-processing steps can be executed in a manner shared by a plurality of near-line finishers. For that reason, the post-processing steps employing near-line finishers are often more complicated than post-processing steps employing the inline finisher in which the post-processing steps cannot be executed in a divided manner. Thus, the proposed known technique accompanies a fear that it becomes difficult for a worker to determine in what sequence prints should be carried to the respective near-line finishers from one to another.

SUMMARY OF THE INVENTION

The present invention has been accomplished with the view of overcoming the above-described problems in the art, and an exemplary embodiment of the present invention reduces a burden exposed on a worker when post-processing is performed by using a near-line finisher (i.e., a post-processing apparatus not installed within a printing apparatus).

More specifically, an exemplary embodiment of the present invention enables a worker to recognize a near-line finisher, which is allocated to execute desired post-processing, without receiving job tickets plural times.

Further, an exemplary embodiment of the present invention is able to prevent a worker from mishandling a step sequence even in post-processing steps in which a plurality of near-line finishers are employed.

Still further, an exemplary embodiment of the present invention enables a worker to easily recognize an allocated near-line finisher from a job ticket.

According to an aspect of the present invention, a print job management apparatus includes an ability ascertaining unit configured to obtain post-processing ability information regarding an ability of a post-processing apparatus which executes post-processing on prints, a searching unit configured to, based on the post-processing ability information obtained by the ability ascertaining unit and post-processing information regarding specifics of the post-processing in a print job, search for each post-processing apparatus having an ability to execute the post-processing in the print job, and a presenting unit configured to present information of plural post-processing apparatuses found by the searching unit, wherein the presenting unit presents, as the information of the plural post-processing apparatuses, a post-processing apparatus having a paper conveying path connected to a printing apparatus and a combination of plural post-processing apparatuses each having a paper conveying path not connected to the printing apparatus.

Further features of the present invention will become apparent from the following description of exemplary embodiments with reference to the attached drawings.

BRIEF DESCRIPTION OF THE DRAWINGS

FIG. 16 represents the first exemplary embodiment of the present invention and is a flowchart illustrating an example of details of processing executed in step S5 of FIG. 15.

FIG. 18 represents the first exemplary embodiment of the present invention and illustrates an example of the job ticket.

FIG. 19 represents the first exemplary embodiment of the present invention and illustrates an example of configuration of a management table for managing post-processing apparatuses (in single or combined use) which can execute post-processing in an ordered job.

FIG. 20 represents the first exemplary embodiment of the present invention and is a flowchart illustrating an example of processing executed by the MIS server when an operator performs checking of identifier information described on the job ticket for causing the post-processing apparatus to perform the post-processing.

DESCRIPTION OF THE EMBODIMENTS

First Exemplary Embodiment

Figure 1:
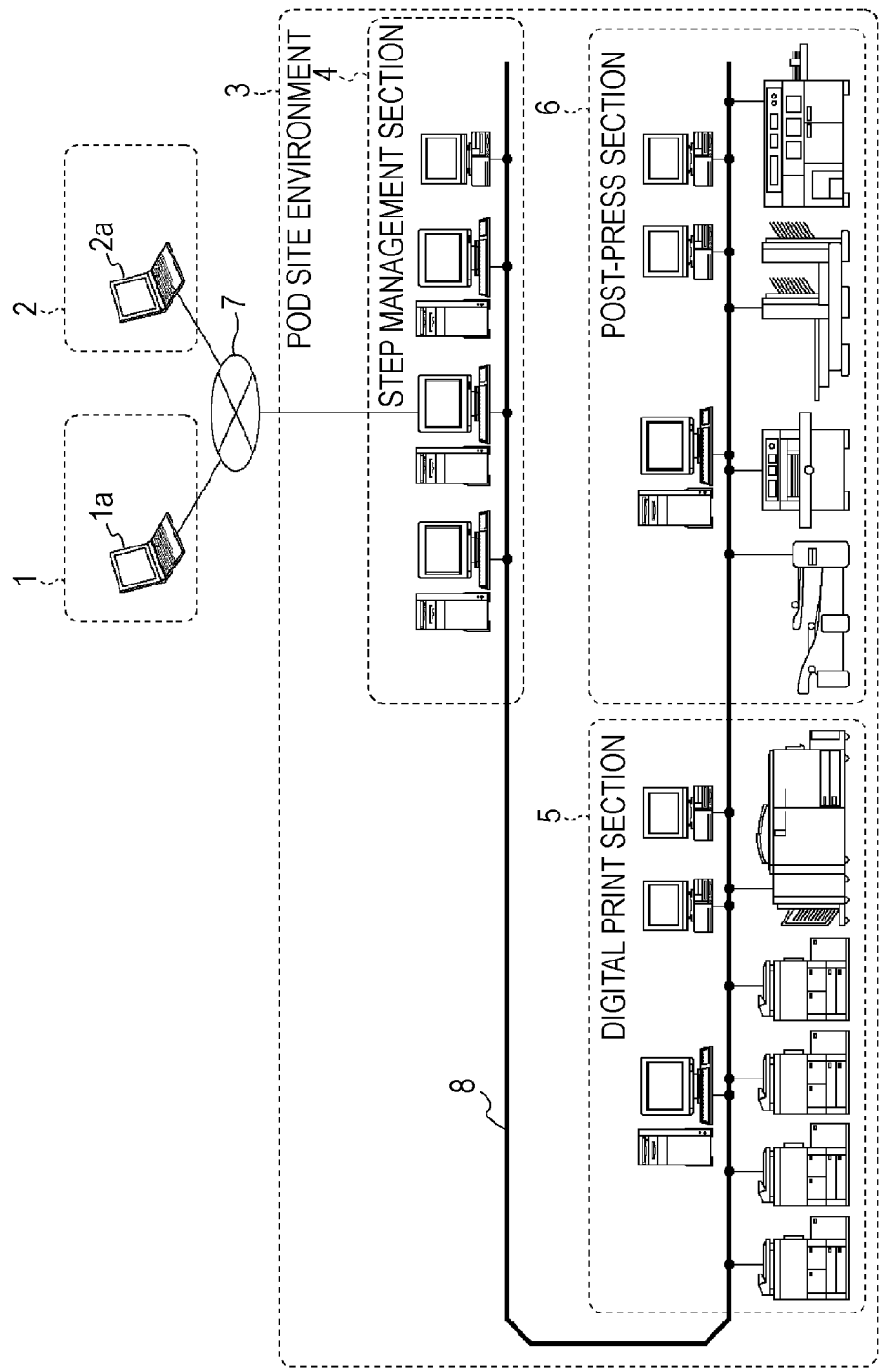
FIG. 1 represents a first exemplary embodiment of the present invention and illustrates an example of a POD system (printing system).

A first exemplary embodiment of the present invention will be described below with reference to the drawings. FIG. 1 illustrates an example of a POD system (printing system). Referring to FIG. 1, the POD system includes end user environments 1 and 2, and a POD site environment 3 connected to the end user environments 1 and 2 via the Internet 7.

In each of the end user environments 1 and 2, an ordering person who requests a print order can, for example, request a print job and confirm a job status by using a client PC 1a or 2a.

On the other hand, the POD site environment 3 includes a step management section 4 and a digital print section 5. In this exemplary embodiment, the POD site environment 3 further includes a post-press section 6 in addition to the two sections 4 and 5. The post-press section 6 includes, for example, near-line finishers which are employed when the function and the capability of an inline finisher physically connected to a digital image processing apparatus, such as a digital copying machine or a digital composite machine, are insufficient. In the following description, the digital composite machine is also called an MFP (Multi-Function Peripherals) as appropriate.

The step management section 4 instructs respective tasks to individual steps in both the digital print section 5 and the post-press section 6 in the POD site environment 3, thus managing a workflow in the POD system which includes computers and various devices. Further, the step management section 4 serves to receive print jobs from the end user environments 1 and 2, to manage the received jobs, and to efficiently schedule respective operations of the various devices and respective tasks of the individual workers for each job.

The digital print section 5 serves to copy a paper document received from each of the end user environments 1 and 2 in accordance with a job (task) instruction for a print job, which is received from the step management section 4. Further, the digital print section 5 serves to print out, from a printer, a scan image file and a document/image file sent from each of the client PCs 1a and 2a in accordance with a job instruction for a print job, which is received from the step management section 4.

The post-press section 6 controls post-processing apparatuses (hereinafter also referred to as "finishing devices"), such as a paper folding machine, a saddle stitch binding machine, a case binding machine, a trimmer, an, enclosing machine, and a collator, in accordance with post-press job instructions received from the step management section 4 or the digital print section 5. Further, the post-press section 6 serves to perform finishing processes, such as paper folding, saddle stitch binding, case binding, trimming, enclosing, and collation, on the printed documents output from the digital print section 5.

Figure 2:
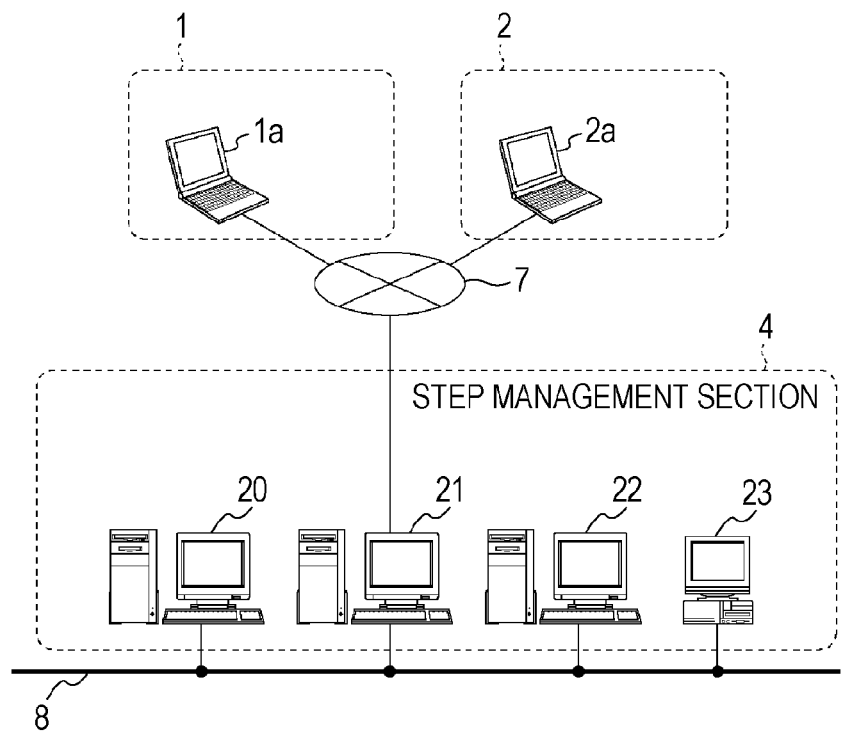
FIG. 2 represents the first exemplary embodiment of the present invention and illustrates an example of configuration of a step management section in the POD system.

FIG. 2 illustrates an example of configuration of the step management section 4 in the POD system. Referring to FIG. 2, the step management section 4 includes an MIS (Management Information System) server 20, an order receiving server 21, a file server 22, and a client PC 23. The MIS server 20, the order receiving server 21, the file server 22, and the client PC 23 are connected to a network 8, such as a LAN.

The MIS server 20 is a server configured to manage a workflow in the entire POD system from a step of receiving an order to a delivery step, and to manage various kinds of business administration information and selling information in a supervisory manner.

The order receiving server 21 is a server configured to receive print jobs from the end user environments 1 and 2 via the Internet 7. The received print jobs are each managed by using, e.g., the ID number of the job. The order receiving server 21 sends the ID number and information necessary for management of the job to the MIS server 20. Further, the order receiving server 21 has a role of sending that information (including the ID number and the information necessary for management of the job) to a downstream step along with other information, such as drawing data (print data), in accordance with an instruction from the MIS server 20.

Figure 24:
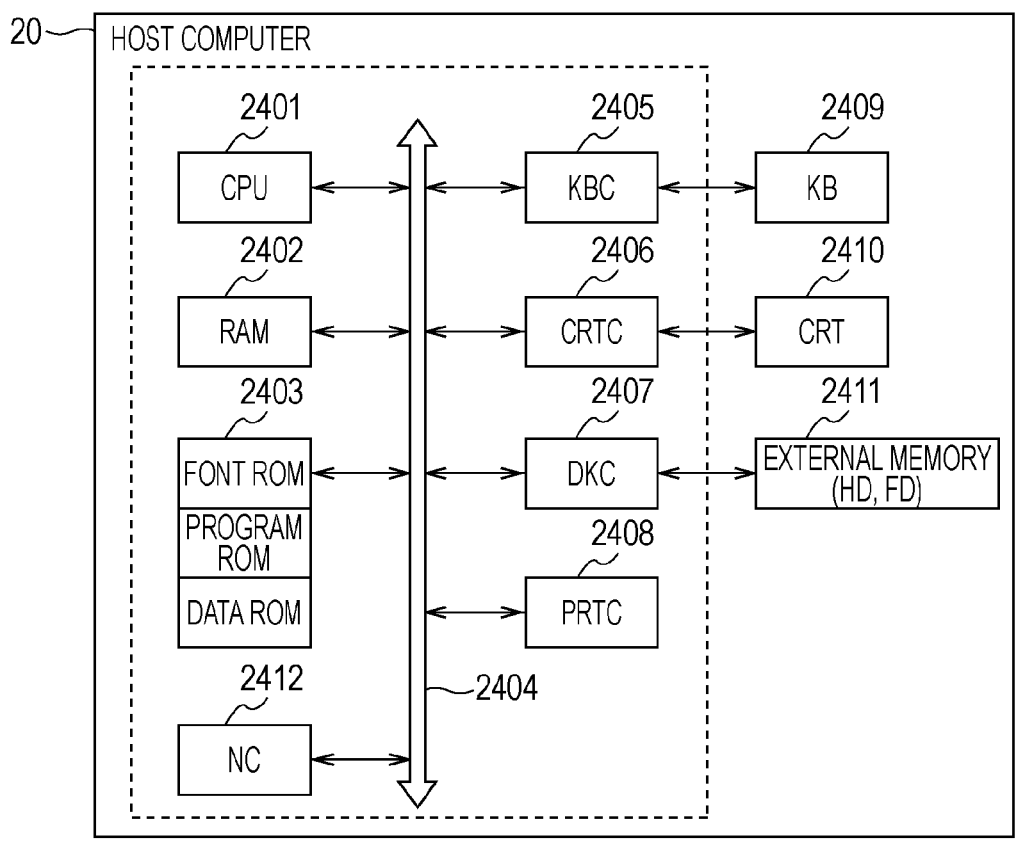
FIG. 24 represents the exemplary embodiment of the present invention and illustrates an example of hardware configuration of each of a server and a client PC.

FIG. 24 illustrates an example of hardware configuration of the MIS server 20 (host computer) in this exemplary embodiment. Each of the other servers 21 and 22 and the client PC 23 also has basically the same hardware configuration as that illustrated in FIG. 24. The MIS server 20 includes a CPU 2401 configured to execute document processing on figures, images, characters, and tables (including spreadsheets), which can be present in documents in mixed fashion, in accordance with, e.g., a document processing program stored in a ROM 2403 or an external memory 2411. In the MIS server 20, the CPU 2401 controls various devices connected to a system bus 2404 in a supervisory manner. Further, an operating system program and other programs, i.e., control programs for the CPU 2401, are stored in a program ROM within the ROM 2403 or in the external memory 2411. Font data, etc. used in processing the documents are stored in a font ROM within the ROM 2403 or in the external memory 2411. Various types of data used, for example, in processing the documents are stored in a data ROM within the ROM 2403 or in the external memory 2411. A RAM 2402 functions as, for example, a main memory and a work area for the CPU 2401.

A keyboard controller (KBC) 2405 controls a key input from a keyboard 2409 or a pointing device (not shown). A CRT controller (CRTC) 2406 controls a view displayed on a CRT display (CRT) 2410. A disk controller (DKC) 2407 controls access to and from an external memory 2411, such as a hard disk (HD) or a flexible disk (FD), which stores files. The files stored in the external memory 2411 includes, for example, a boot program, various applications, font data, user files, edit files, and a printer control command generation program (hereinafter referred to as a "printer driver"). A printer controller (PRTC) 2408 is connected to an external device through a bidirectional interface (I/F) and executes communication control processing with respect to the external device. A network controller (NC) 2412 is connected to a network and executes communication control processing with respect to one or more other apparatuses which are connected to the network.

The CPU 2401 executes a process of rasterizing display information set on the RAM 2402, for example, into outline fonts so that the display information can be displayed on the CRT 2410 in the WYSIWYG format. Further, the CPU 2401 opens various windows, which are registered in advance, in accordance with commands instructed through, e.g., a mouse cursor (not shown) on the CRT 2410, and then executes various types of data processing. When a user executes printing, the user can open a window related to print setting and can make setting of the external device and setting of a print processing method, including selection of a print mode, with respect to the printer driver.

The file server 22 is a document management server which stores the print jobs received by the order receiving server 21 from the end user environments 1 and 2 to be ready for the case where orders for the same documents are received again from the end user environments 1 and 2 at a later point in time. Generally, the file server 22 stores image data along with setting information (job ticket) of the print job which has been set at the last outputting of the image data.

The step management section 4 performs information exchange by employing, e.g., the job ticket describing job instructions for each print job, which are called JDF (Job Definition Format) data. The step management section 4 transfers the print job and issues control commands, thus realizing automation of the entire workflow in cooperation with the digital print section 5, the post-press section 6, etc.

Figure 3:
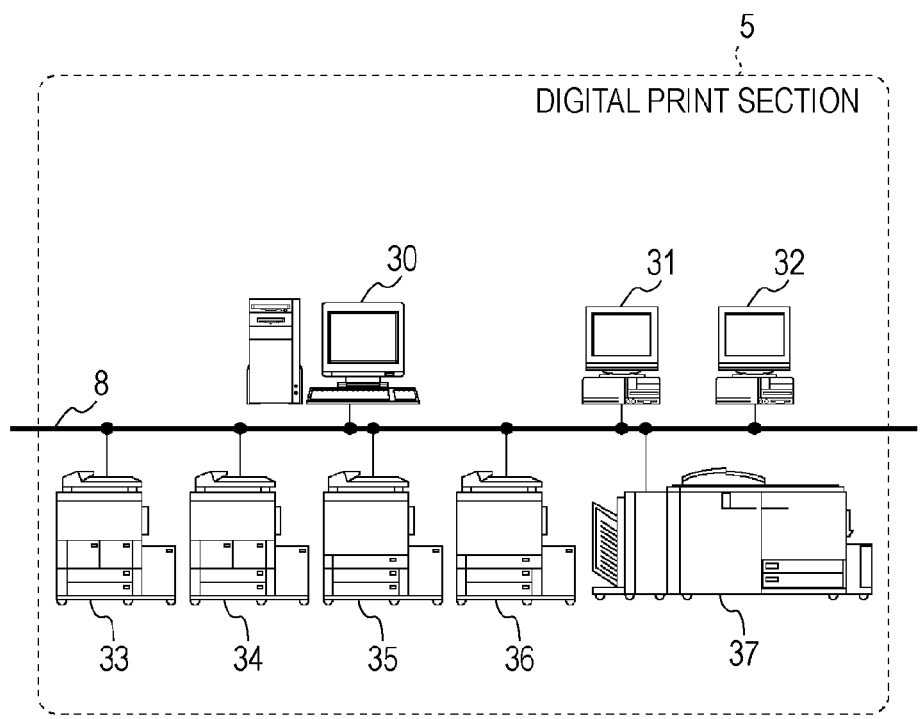
FIG. 3 represents the first exemplary embodiment of the present invention and illustrates an example of configuration of a digital print section in the POD system.

FIG. 3 illustrates an example of configuration of the digital print section 5 in the POD system. The digital print section 5 includes a print server 30, client PCs 31 and 32, color MFPs 35, 36 and 37, and monochrome MFPs 33 and 34. The print server 30, the client PCs 31 and 32, the color MFPs 35, 36 and 37, and the monochrome MFPs 33 and 34 are connected to the network 8.

The print server 30 has two roles. One role is to send and receive information from and to the outside of the digital print section 5. Image information, setting information and so on of the print job are input to the print server 30. When the execution of the print job is completed, the print server 30 notifies information regarding the print job, respective statuses of the MFPs 33 to 37, etc. to the outside.

The other role of the print server 30 is to execute management and control in the digital print section 5. The print server 30 can monitor not only respective statuses of all devices within the digital print section 5, but also respective statuses of all jobs within the digital print section 5, including jobs which have been externally input and jobs which have been generated in the digital print section 5. Further, the print server 30 executes temporary stop of those jobs, change of the setting, restart of printing, copying, movement and deletion of those jobs, etc.

The client PCs 31 and 32 serve to edit application files input thereto, to instruct the printing, and to apply a print ready file. Further, the client PCs 31 and 32 serve to assist monitoring and control of the devices and the jobs, which are managed within the print server 30.

The color MFPs 35, 36 and 37 and the monochrome MFPs 33 and 34 are each a digital image processing apparatus having various functions such as scanning, printing, and copying. Further, a finishing device (inline finisher) is connected to (associated with) the color MFP 37.

Figure 4:
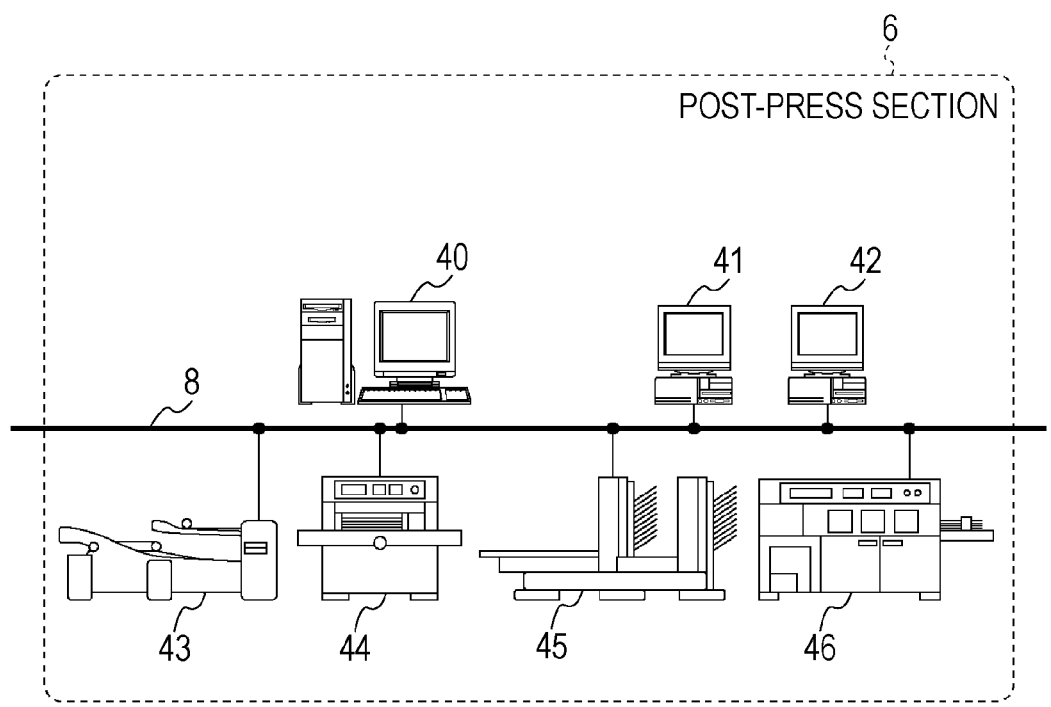
FIG. 4 represents the first exemplary embodiment of the present invention and illustrates an example of configuration of a post-press section in the POD system.

FIG. 4 illustrates an example of the configuration of the post-press section 6 in the POD system. The post-press section 6 includes a post-press server 40 and client PCs 41 and 42, as well as post-processing apparatuses represented by a paper folding machine 43, a trimmer 44, a saddle stitch binding machine 45, and a case binding machine 46. The post-press server 40, the client PCs 41 and 42, the paper folding machine 43, the trimmer 44, the saddle stitch binding machine 45, and the case binding machine 46 are connected to the network 8.

The post-press server 40 is a computer configured to manage post-processing steps in a supervisory manner. More specifically, the post-press server 40 produces a post-processing condition under which a finishing process can be executed in the post-press section 6, in accordance with, e.g., a print job instruction received by the order receiving server 21 and a job instruction issued from the MIS server 20, such that the post-processing (finishing) steps are instructed to be executed as per requested by the end user. In general, the post-press server 40 serves to exchange information with respect to the outside of the post-press section 6. Further, the post-press server 40 exchanges information with respect to the individual post-processing apparatuses by using internal commands and statues in the post-press section 6.

The post-processing apparatuses can be mainly classified into three types. In this exemplary embodiment, those three types are defined as follows.

Inline finisher: a post-processing apparatus of the type that a paper conveying route (paper path) therein is physically connected to the MFPs 33 to 37 and operation instructions and status confirmation can be performed through electrical connection to the MFPs 33 to 37.

Near-line finisher: a post-processing apparatus of the type that a paper path therein is not physically connected to the MFPs 33 to 37. Therefore, the worker (operator) is required to manually carry prints, which are produced by the MFPs 33 to 37, from the MFPs 33 to 37 to the near-line finisher for setting the prints in the latter. However, the operation instructions, the status confirmation, etc. can be performed by sending and receiving electrical information through a communication unit such as the network 8.

Offline finisher: a post-processing apparatus of the type that not only a paper path therein, but also the communication unit for transferring the operation instruction and performing the status confirmation, etc. are not connected to the MFPs 33 to 37 at all. Accordingly, the worker (operator) is required to manually carry prints, which are produced by the MFPs 33 to 37, from the MFPs 33 to 37 to the offline finisher for setting the prints in the latter. Further, the worker is required to manually input the operation instruction and to visually confirm a status report issued from the offline finisher.

The post-processing apparatuses perform post-processing steps, i.e., various sheet-handling steps, such as a trimming step and a saddle stitch binding step, on documents printed by the image processing apparatuses, such as the MFPs 33 to 37, thus finishing the printed documents into the form of a bound book that is provided to the end user.

The near-line finishers managed by the post-press server 40 include a stapler, a puncher, etc. in addition to the paper folding machine 43, the trimmer 44, the saddle stitch binding machine 45, and the case binding machine 46 illustrated in FIG. 4. The post-press server 40 executes, e.g., polling at certain intervals with respect to the near-line finishers based on the predefined protocol so as to confirm respective statuses of the near-line finishers and respective job statuses and to manage job execution statuses. The above-described post-processing (finishing) steps can be performed by using a plurality of separate near-line finishers. Alternatively, only one near-line finisher can be used to perform plural types of the post-processing steps. Instead of installing all of the near-line finishers described above, two or more selected from the above-described near-line finishers can be installed in the POD system.

In this exemplary embodiment, it is assumed that each of the MFPs 33 to 37 also has the same functions (i.e., the functions of sending and receiving information with respect to the outside of the digital print section 5 and managing and controlling the print job) as those of the print server 30. Specifically, an EFM (Embedded Finishing Manager) unit in each MFP has those functions. Accordingly, the print server 30 is not always needed.

A workflow using a job ticket is proposed in a general POD system. Therefore, an example of the "workflow using the job ticket" and an example of the job ticket in the general POD system will be described below. Note that the term "job ticket" used in this exemplary embodiment implies a job instruction sheet on which information indicating specifics of job instructions is described.

Figure 5:
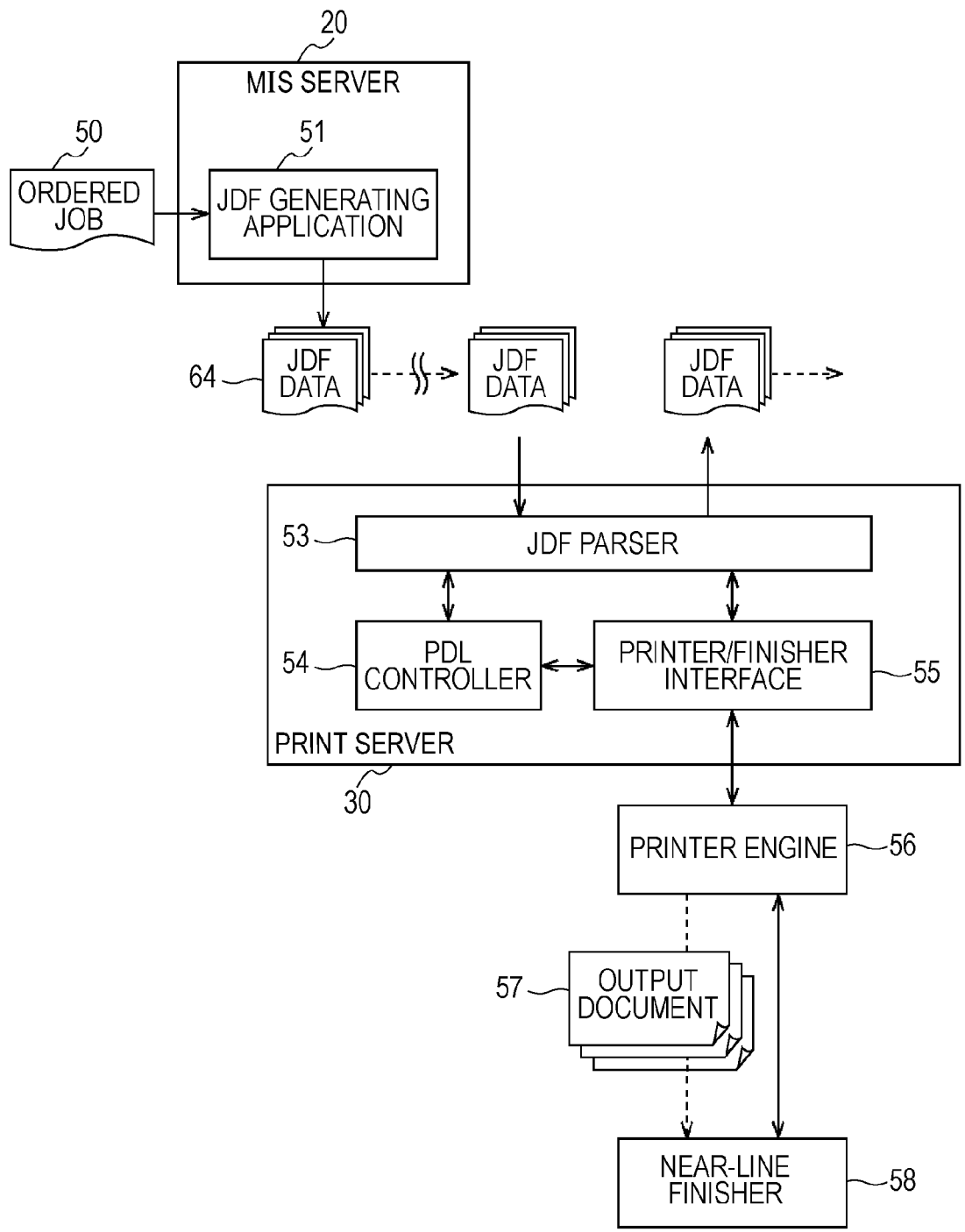
FIG. 5 represents the first exemplary embodiment of the present invention and conceptually illustrates an example of a workflow that is realized with a job ticket.

FIG. 5 conceptually illustrates an example of a workflow that is realized with a job ticket. The MIS server 20 includes a JDF generating application 51 for generating JDF data 64 that corresponds to the job ticket on which job instructions for executing the workflow are described. In this exemplary embodiment, it is assumed that when distribution or replacement of the post-processing step is needed, the EFM unit generates JDF data (job ticket) for the distribution or the replacement. However, the MIS server 20 can also generate the JDF data for the distribution or the replacement upon receiving a request from the EFM unit.

The print server 30 includes a JDF parser 53, a PDL controller 54, and a printer/finisher interface 55.

The JDF parser 53 parses (interprets) the JDF data 64. The PDL controller 54 processes various PDL data. The printer/finisher interface 55 serves to establish connection to a printer engine 56 in each of the MFPs 33 to 37, etc. and to a near-line finisher 58 such as the paper folding machine 43.

The workflow progressed using the job ticket is implemented, for example, as follows. When an ordered job 50 is applied to the MIS server 20, the JDF generating application 51 installed in the MIS server 20 generates the JDF data 64 that corresponds to the job ticket on which job instructions for executing the workflow are described.

Further, the JDF parser 53 in the print server 30 parses the JDF data 64 to execute a job set for the printer engine 56. For example, the JDF data 64 includes data designating such attributes as the size of an output sheet, duplex/simplex printing, N-up printing, and so on. The PDL controller 54 processes PDL data in the form of PDF/PS, for example, which is cross-referenced by the JDF data 64, and further instructs the printer engine 56 to execute printing through the printer/finisher interface 55.

An output document 57 obtained with the execution of the printing is conveyed to the near-line finisher 58, and the printer/finisher interface 55 instructs the near-line finisher 58 to execute the post-processing steps in accordance with the specifics set in the JDF data 64 (i.e., the post-processing steps such as the case binding, the saddle stitch binding, and/or the trimming).

Figure 6:
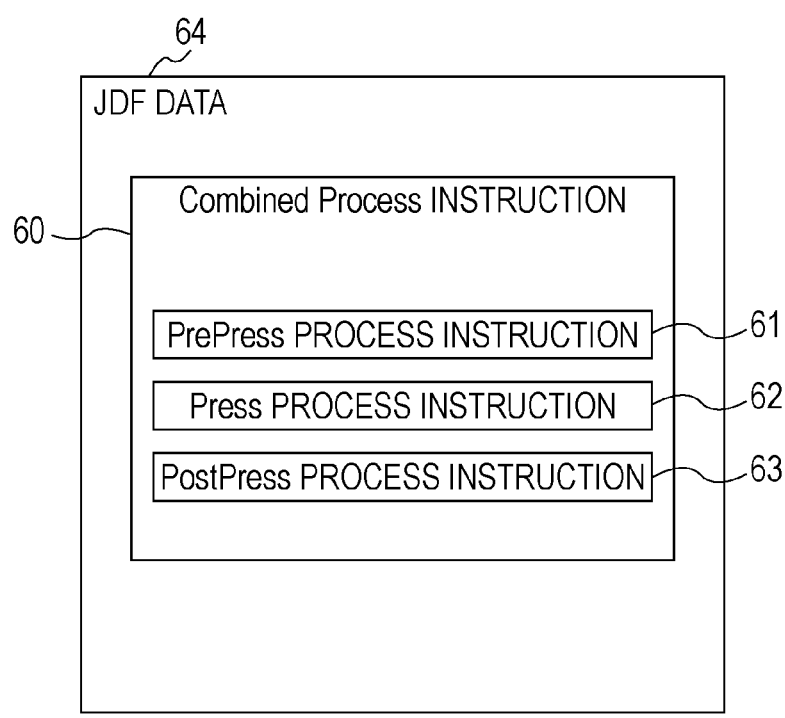
FIG. 6 represents the first exemplary embodiment of the present invention and illustrates an example of rough configuration of the job ticket (JDF (Job Definition Format) data) used in the POD system.

FIG. 6 illustrates an example of rough configuration of the job ticket (JDF data 64) used in the POD system. In the JDF data 64, a PrePress process instruction 61 describes a plurality of PrepPress process instruction groups indicating, for example, how print contents data (drawing data), e.g., PDF data, is image-processed and arranged.

A Press process instruction 62 describes a plurality of Press process instruction groups indicating, for example, how the image data having been generated in accordance with the PrePress process instruction 61 is output as a print document.

A PostPress process instruction 63 describes a plurality of PostPress process instruction groups indicating, for example, how the print document having been output in accordance with the Press process instruction 62 is finished in the post-processing steps.

A Combined Process instruction 60 collects the PrePress process instruction 61, the Press process instruction 62, and the PostPress process instruction 63 into one process.

Usually, in an image processing apparatus equipped with an inline finisher (e.g., the color MFP 37 in this exemplary embodiment), an output result obtained by executing a series of processing steps from the PrePress process to the PostPress process on one input of the print job is provided as only one output. Thus, the Combined Process instruction 60 is used, for example, when an instruction is to be issued with intent to execute the PrePress process, the Press process, and the PostPress process on one input of data and to provide an output result for the one data input. However, the use of the Combined Process instruction 60 is not limited to such a case. Stated another way, the Combined Process instruction 60 can be used to instruct an image processing apparatus, e.g., an MFP, which executes at least two of the PrePress process, the Press process, and the PostPress process, to provide an output. Note that the term "PrePress process" implies processing to be executed before the printing (i.e., pre-processing), the term "Press process" implies print processing, and the term "PostPress process" implies processing to be executed after the printing (i.e., post-processing or finishing), respectively.

Figure 7:
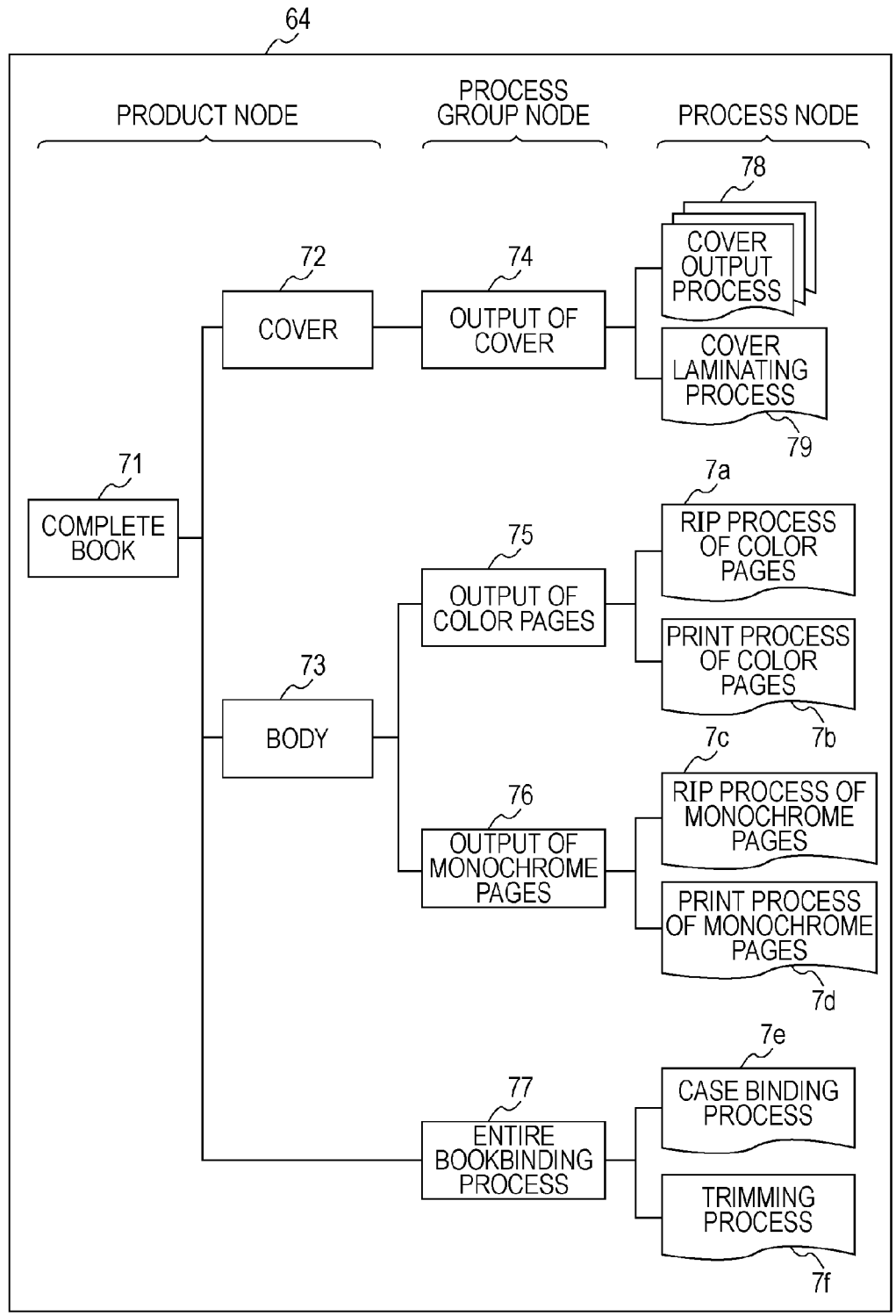
FIG. 7 represents the first exemplary embodiment of the present invention and illustrates an example of structure of the job ticket (JDF data) used in the POD system.

FIG. 7 illustrates an example of structure of the job ticket (JDF data 64) used in the POD system. In FIG. 7, the JDF data 64 expressing the job ticket is described in the XML format. Further, the JDF data 64 is expressed in a hierarchical structure of nodes. Thus, in FIG. 7, the job ticket is expressed in a hierarchical diagram that represents an example of bookmaking and book-binding by using JDF. In contrast, in FIG. 6, the structure of the JDF data 64 representing the job ticket is expressed based on the types of execution processes.

A complete book 71 is produced through various steps of forming a cover 72, preparing a body (pages) 73, and binding them into the form of a book.

When an output material is produced with a JDF-based workflow, a step of forming a physical output material is called a product node. Also, a processing step to form the product node is called a process node. Further, an assembly of several process nodes, which corresponds to an element in the intermediate stage for forming the product node, is called a process group node. In such a manner, individual steps are discriminated from one another in the JDF-based workflow.

The PrePress process instruction 61, illustrated in FIG. 6, corresponds to an RIP (Raster Image Processing) process 7*a* of color pages and an RIP process 7*c* of monochrome pages. The Press process instruction 62 corresponds to a cover output process 78, a cover laminating process 79, a print process 7*b* of the color pages, and a print process 7*d* of the monochrome pages. The PostPress process instruction 63 corresponds to a case binding process 7*e* and a trimming process 7*f*.

Figure 8:
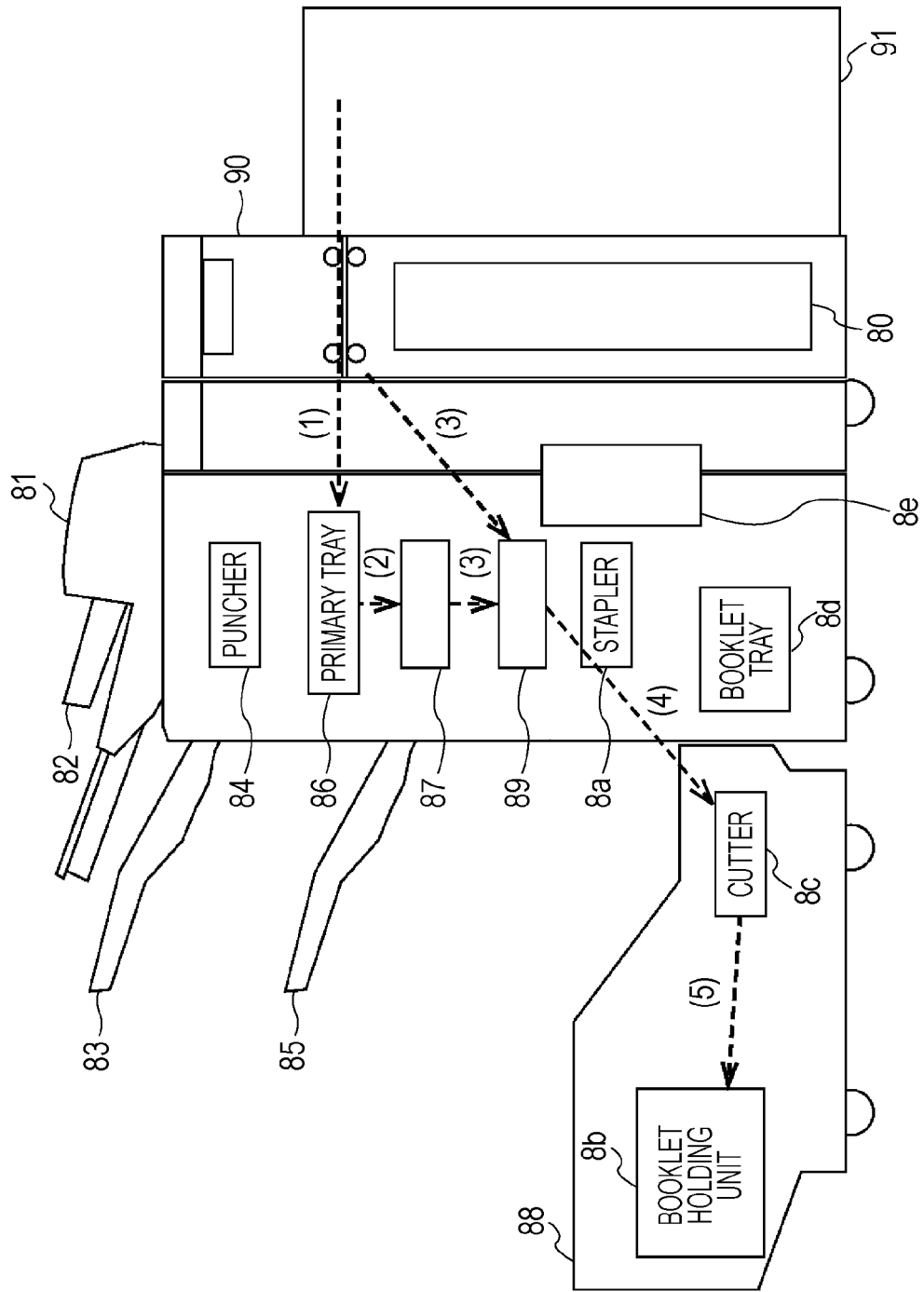
FIG. 8 represents the first exemplary embodiment of the present invention and illustrates an example of construction of an inline finisher.

FIG. 8 illustrates an example of construction of the inline finisher. In this exemplary embodiment, the color MFP 37 includes the inline finisher.

Print documents ejected from a fusing portion of a device body 91, i.e., a printer unit, are conveyed to an inline finisher 90. The inline finisher 90 includes a sample tray 83 and a stack tray 85. The print documents are ejected onto one of trays for document ejection, which is changed over depending on the type of the print job and the number of the print documents.

For example, when a stapling mode is set for the print job to be output, the inline finisher 90 ejects the print documents onto the stack tray 85 after stapling the print documents by a stapler 8*a*. Further, the inline finisher 90 includes, in the course of routes until reaching the above-mentioned two trays (i.e., the sample tray 83 and the stack tray 85), a Z-folding machine 80 for folding each of the print documents into the Z-form and a puncher 84 for punching each of the print documents to form two (or three) holes for filing. Folding and punching processes are selectively performed depending on the type of the print job. In addition, a saddle stitcher 8*e* performs a process (bookbinding process) of binding central portions of the print documents together at two points, and folding the print documents into halves by introducing the central portions of the print documents into a nip between rollers, thereby forming a booklet like a pamphlet. The print documents bound together by the saddle stitcher 8*e* are ejected onto a booklet tray 8*d*.

An inserter 81 sends a print document set on an insert tray 82 to one of the ejection trays, such as the stack tray 85 and the sample tray 83, without passing the print document to the printer unit. Thus, the print document set on the inserter 81 can be inserted (slip-inserted) to the print documents conveyed into the inline finisher 90 (i.e., to the print documents printed by the device body 91).

A trimmer (cutting machine) 88 will be described below. The print document bound into a booklet (saddle-stitched booklet) by the saddle stitcher 8*e* is conveyed to the trimmer 88. At that time, the print documents in the form of a booklet are first fed through a predetermined distance (length) by using rollers and are cut off at the predetermined length by a cutter 8*c*. As a result, uneven ends of plural pages of the booklet are neatly aligned so as to lie on a line. The booklet having the finished ends is put onto a booklet holding unit 8*b*.

The case binding process and print-document conveying paths will be described below. First, print documents constituting a body of a booklet are ejected from the device body 91 such that the print documents for one booklet (corresponding to the number of pages of one booklet under bookbinding printing) are held on a primary tray 86 (conveying path (1)). After the print documents for one booklet have been accumulated on the primary tray 86, the print documents are conveyed in an aligned state to a pasting unit 87 (conveying path (2)) in which a paste is applied to a side of the print documents corresponding to a backbone of the booklet. At the same time as the pasting process, a cover document is ejected from the device body 91 and is set in a case binding unit 89 (conveying path (3)). After the paste has been applied to the print documents and the cover document has been set, the print documents with the applied paste are conveyed to the case binding unit 89 (conveying path (3)) in which the print documents with the applied paste are lapped with the cover document. After such a case binding process, the print documents including the cover are conveyed to the cutter 8c (conveying path (4)) in which edges of the print documents are cut so as to align on a line. Finally, the print documents including the cover are put onto the booklet holding unit 8b (conveying path (5)).

As described above, the print documents output from the device body 91 are finished by the inline finisher 90 through the bookbinding process (including, e.g., stapling, punching, saddle stitch binding, and case binding).

Figure 9:
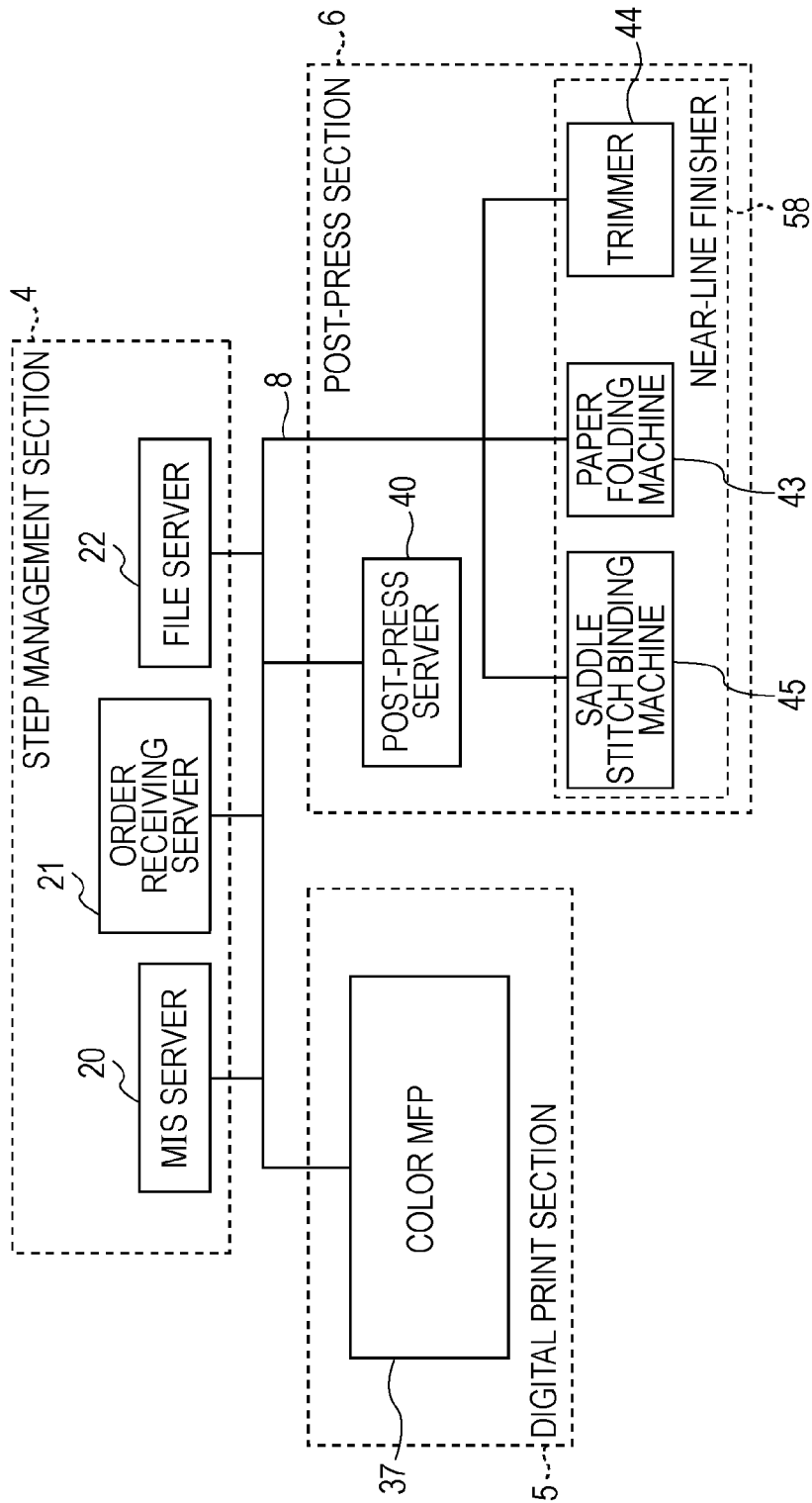
FIG. 9 represents the first exemplary embodiment of the present invention and illustrates components excerpted from the entire POD system, illustrated in FIGS. 1 to 4, which are particularly needed for explaining the first exemplary embodiment.

FIG. 9 illustrates components excerpted from the entire POD system, illustrated in FIGS. 1 to 4, which are particularly needed for explaining the first exemplary embodiment. In this exemplary embodiment, as described above, the step management section 4 in the POD system includes the MIS server 20, the order receiving server 21, and the file server 22. The digital print section 5 includes the color MFP 37 which executes a series of processes until outputting a print document on which drawing (print) data is drawn (printed), in accordance with instructions specified in the JDF data 64.

The post-press section 6 includes the post-press server 40 and a plurality of near-line finishers 58 (such as the paper folding machine 43, the trimmer 44, and the saddle stitch binding machine 45). The post-press server 40 sends respective statuses of various devices in the post-press section 6 to the MIS server 20 and receives the JDF data 64 from the MIS server 20. The MIS server 20, the color MFP 37, the post-press server 40, and so on are connected to the network 8.

In this exemplary embodiment, the MIS server 20 manages the workflow in the entire system from a step of receiving an order to a delivery step. More specifically, the received order (ordered job 50) is sent from the order receiving server 21 to the MIS server 20 and held therein. The MIS server 20 has the function of managing a print job processing schedule for the entire POD system and generates the JDF data 64 based on the order sent from the order receiving server 21. Then, the MIS server 20 generates processing schedule information for managing the generated JDF data 64 as JDF data that is to be processed in the POD system. Thereafter, the MIF server 20 sends the JDF data 64 to the digital print section 5 in accordance with the generated processing schedule information, thus instructing the start of the print job. Further, the MIF server 20 receives, from the digital print section 5, status information indicating the current processing status.

In addition, the MIS server 20 receives a notification indicating the end of the print job from the digital print section 5 and sends, to the post-press section 6, JDF data instructing the post-processing (finishing) steps which are to be performed on the print documents output from the digital print section 5. Then, the MIS server 20 receives, from the post-press section 6, status information indicating the status of each of the post-processing (finishing) steps. Upon completion of the post-processing (finishing) steps, the MIS server 20 receives, from the post-press section 6, a notification indicating the end of the post-processing (finishing) steps. Further, the MIS server 20 notifies the received information to the operator through the CRT connected to the MIS server 20 or through the CRT connected to the client PC 23.

Figure 10:
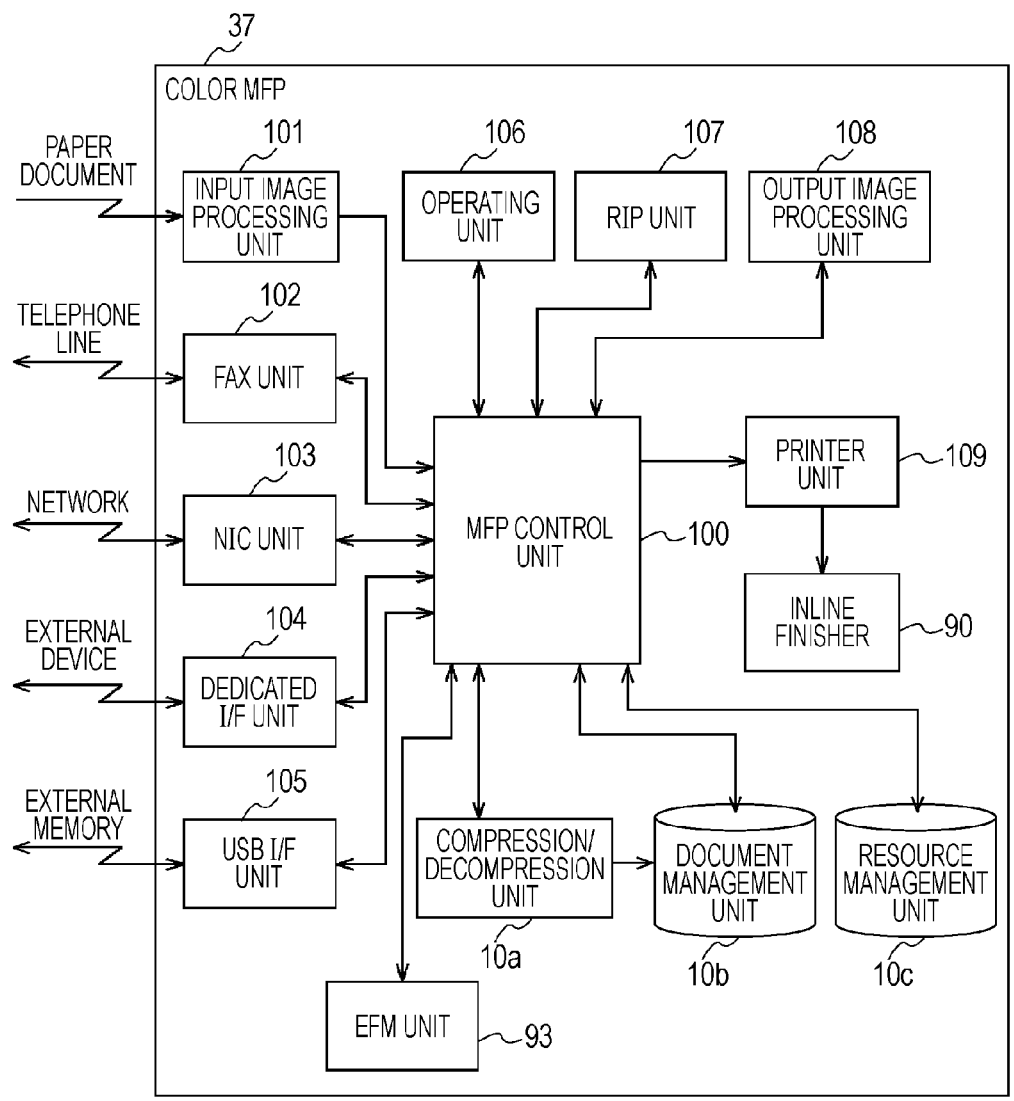
FIG. 10 represents the first exemplary embodiment of the present invention and is a block diagram illustrating, in detail, an example of internal configuration of a color MFP.

FIG. 10 is a block diagram illustrating, in detail, an example of internal configuration of the color MFP 37. The color MFP 37 includes a document management unit 10b in the form of a storage unit, such as a hard disk. The color MFP 37 has a copy function for enabling data, which is stored in the document management unit 10b, to be printed by a printer unit 109. Further, the color MFP 37 has a print function for enabling data, which is output from an external computer or some other apparatus, to be printed by the printer unit 109 through the document management unit 10b.

In this exemplary embodiment, when the print job runs over the network outside the color MFP 37, the print job is expressed by the JDF data 64. However, when the print job processed in the color MFP 37, it is just required to have the format capable of being processed by an MFP control unit 100. For example, the print job in the color MFP 37 is made up of the JDF data 64 and print contents data. In such a case, the print contents data is processed in accordance with the JDF data 64.

As illustrated in FIG. 10, the color MFP 37 includes an input image processing unit 101 configured to execute image processing of image data, and a FAX unit 102 configured to send and receive image data via a telephone line. Further, the color MFP 37 includes a NIC (Network Interface Card) unit 103 configured to transfer image data with respect to an external device via the network 8, and a dedicated interface unit 104 configured to exchange information, such as image data, with respect to an external device. Still further, the color MFP 37 includes a USB (Universal Serial Bus) interface (USB I/F) 105 for sending and receiving image data, etc. to and from a USB device, which is represented by a USB memory as a removable medium.

The MFP control unit 100 has functions of temporarily storing image data depending on the usage of the color MFP 37 and determining the route of data, such as image data.

The document management unit 10b is in the form of a memory, such as a hard disk, which can store a plurality of image data. In cooperation with the document management unit 10b, the MFP control unit 100 primarily executes the following processes, for example. The MFP control unit 100 includes, e.g., a not-shown processor (e.g., a CPU), a RAM, and a hard disk, and it can realize the following processes by executing predetermined programs in the processor.

The MFP control unit 100 executes control for storing, in the document management unit 10b, not only image data input through the input image processing unit 101, the FAX unit 102, and the NIC unit 103, but also plural kinds of image data input through the dedicated I/F unit 104 and the USB I/F unit 105.

Further, the MFP control unit 100 reads the image data stored in the document management unit 10b as required, transfers the read image data to an output unit, e.g., the printer unit 109, and controls an output process, e.g., a print process by the printer unit 109, to be executed. In response to an instruction from the operator, the MFP control unit 100 controls the image data read out from the document management unit 10b in such a way that the read image data can be transferred to an external device, e.g., another computer or another image processing apparatus.

When image data is stored into the document management unit 10b and image data is read out from the document management unit 10b, the MFP control unit 100 utilizes a compression/decompression unit 10a as required. The compression/decompression unit 10a executes processes of compressing the image data and decompressing the compressed data for restoration to the original image data. In some cases, data compressed in the format of JPEG, JBIG, ZIP or the like is used as data transferred via the network 8. When the compressed data is input to the color MFP 37, the input compressed data is thawed (decompressed) in the compression/decompression unit 10*a*. A resource management unit 10*c* controlled by the MFP control unit 100 stores therein various parameter tables which are handled in common to various image data, such as fonts, a color profile, and a gamma table. The resource management unit 10*c* can invoke any of the various parameter tables, can store a new parameter table therein, and can revise and update the existing parameter table, as required.

When PDL data is input as the print job, the MFP control unit 100 executes the following process. The MFP control unit 100 instructs an RIP (Raster Image Processor) unit 107 to execute an RIP process on the PDL data to generate image data, and also performs image processing on the image data to be printed. Further, the MFP control unit 100 can restore intermediate data and/or print ready data (e.g., bitmap data for printing or compressed data thereof), which is derived from the image data during the RIP process and other image processing, into the document management unit 10*b* as required. In addition, the MFP control unit 100 sends the generated image data to the printer unit 109 in which an image is formed.

Print documents printed out in the printer unit 109 are sent, as required, to the inline finisher 90 which performs the post-processing steps. In the inline finisher 90, the print documents are subjected to a sorting process and/or a finishing process.

In the above-described processes, the MFP control unit 100 has a role of controlling the jobs so as to proceed smoothly. For that purpose, the MFP control unit 100 changes over job paths (routes) depending on the usage of the color MFP 37. An example of the job paths will be described below. The following description is, however, made in such a manner just enough to understand outline of the job paths by omitting respective processes executed in, e.g., the compression/decompression unit 10*a*, the inline finisher 90, and the MFP control unit 100 serving as a center of coverall control for the color MFP 37, which are employed to execute the jobs as required.

FAX receiving function: FAX unit 102→output image processing unit 108→printer unit 109

Network printing: NIC unit 103→RIP unit 107→output image processing unit 108→printer unit 109

Printing from external device: dedicated I/F unit 104→output image processing unit 108→printer unit 109

Printing from external memory: USB I/F unit 105→RIP unit 107→output image processing unit 108→printer unit 109

Box print function: document management unit 10*b*→printer unit 109

Herein, the term "box print function" implies one processing function of the color MFP 37 utilizing the document management unit 10*b*. In more detail, with the box print function, a memory within the document management unit 10*b* is divided per job or per user, and data is temporarily stored in the divided memory. When a user ID or a password is input and passes authentication, the relevant data is output to be printed.

An operating unit 106 is manipulated by the user to select desired one of the above-described various functions of the color MFP 37 and to instruct the operation. With an increase in resolution of a display apparatus disposed in the operating unit 106, a thumbnail image can be displayed on the display apparatus based on the image data stored in the document management unit 10*b*. In such a case, after a thumbnail image has been displayed (previewed) based on the image data stored in the document management unit 10*b* and the user has instructed the displayed image data to be printed, the relevant image data is printed.

Figure 11:
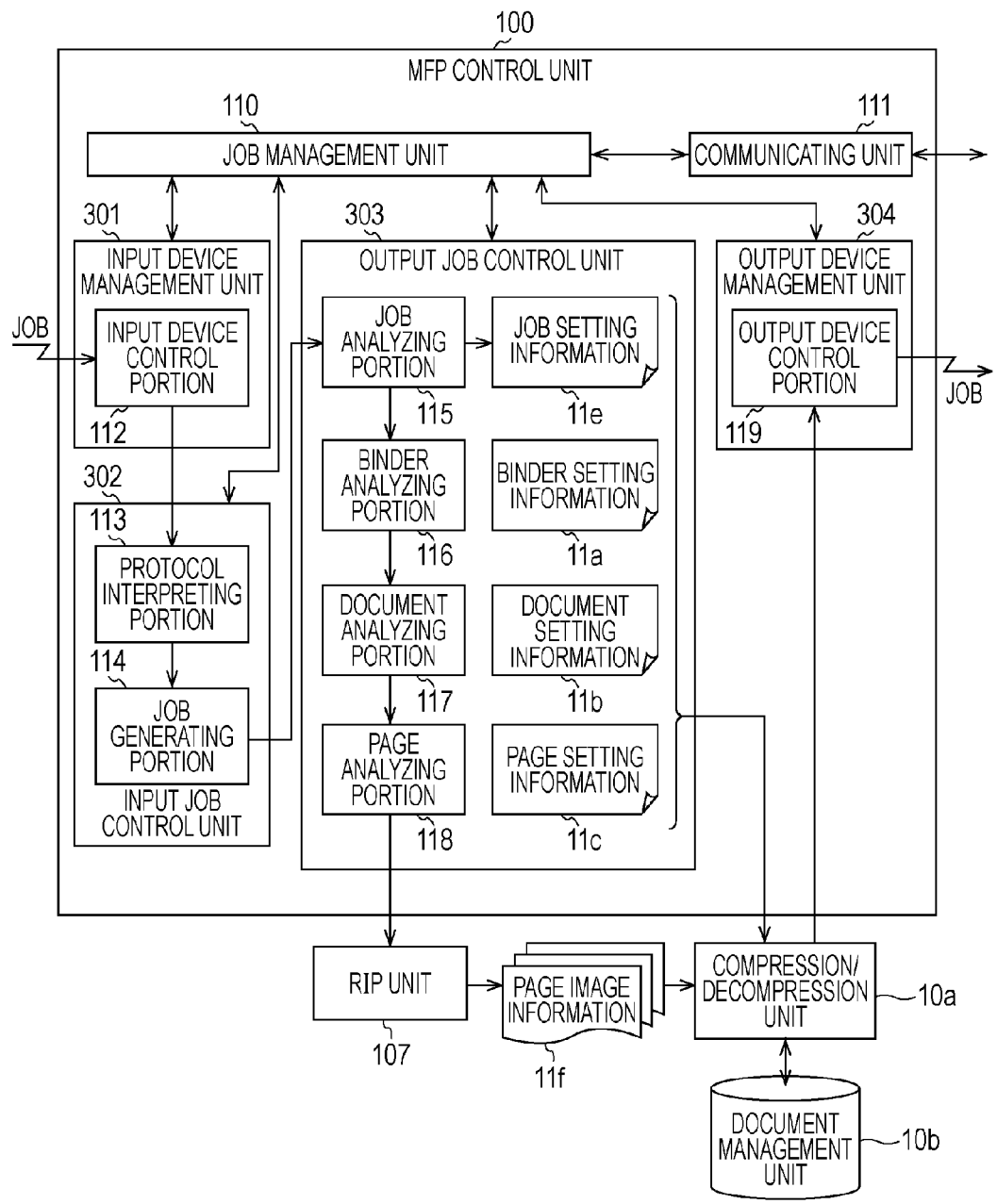
FIG. 11 represents the first exemplary embodiment of the present invention and is a block diagram illustrating, in detail, an example of configuration of an MFP control unit.

FIG. 11 is a block diagram illustrating, in detail, an example of configuration of the MFP control unit 100. Referring to FIG. 11, the MFP control unit 100 mainly includes five units. In more detail, the MFP control unit 100 includes an input device management unit 301 configured to mange an input device, an input job control unit 302 configured to interpret an input job, and an output job control unit 303 configured to assort and/or rearrange job setting information. Further, the MFP control unit 100 includes an output device management unit 304 configured to assign an output device to the job, and a job management unit 110 configured to control the transferred job.

The input device management unit 301 assorts and/or rearranges respective input signals from the input units 101 to 105 illustrated in FIG. 10, and also determines the sequence in changing over respective output destinations of the input signals. An input device control portion 112 controls the input device management unit 301 so that the input device management unit 301 can perform the function thereof. The input signals are, for example, PDL data and image data from the file server 22, as well as JDF data from the job management unit 110.

The input job control unit 302 includes a protocol interpreting portion 113 and a job generating portion 114. A series of operation requests sent from the input device management unit 301 are received as instruction signals called "commands". The protocol interpreting portion 113 interprets details (protocols) of the received operation requests and converts commands to operating procedures that are interpretable inside the color MFP 37. On the other hand, the job generating portion 114 generates internal jobs. The internal jobs are defined with respective scenarios indicating, for example, what processing is to be executed on data within the color MFP 37, and to where the processed data is to be sent. The data flows within the color MFP 37 in accordance with the scenarios.

In the output job control unit 303, job setting information and image information are generated in a job analyzing portion 115, a binder analyzing portion 116, a document analyzing portion 117, and a page analyzing portion 118.

The job analyzing portion 115 analyzes job setting information lie regarding an entire print job, such as the name of a document to be printed, the number of prints, designation of a paper ejection tray as an output destination, and the binder order in the print job that includes plural binders.

The binder analyzing portion 116 analyzes details of binder setting information 11*a* regarding entire binders, such as setting of the book binding style, the position of stapling, and the document order in the binder that includes plural documents.

The document analyzing portion 117 analyzes details of document setting information 11*b* regarding entire documents, such as the page order in the document that includes plural pages, designation of duplex printing, and addition of a cover and/or an inserted sheet.

The page analyzing portion 118 analyzes details of page setting information 11*c* regarding various settings of entire pages, such as image resolution and image orientation (e.g., landscape/portrait). In addition, when PDL data is input, the page analyzing portion 118 instructs the RIP unit 107 to execute a rasterizing process on the PDL data. Page image information 11*f* is generated by the RIP unit 107 executing the rasterizing process in accordance with an instruction from the page analyzing portion 118. The page image information 11*f* is compressed in the compression/decompression unit 10*a* and then stored in the document management unit 10*b* in relation to the setting information.

The output device management unit 304 includes an output device control portion 119. The image information stored in the document management unit 10*b* is decompressed by the compression/decompression unit 10*a* and is read out along with the setting information that is also stored in relation to the corresponding information. In other words, the setting information and the image information are sent in pair to the output device control unit 119. The output device control unit 119 executes scheduling for "processes executed within the color MFP 37", including which one of the devices inside the color MFP 37, e.g., the printer unit 109 or the inline finisher 90, is to be utilized in which process.

A communicating unit 111 sends/receives the JDF data 64 and the print contents data, sends/receives the print status, and receives a print job process instruction.

The job management unit 110 receives, through the communicating unit 111, not only the JDF data 64, but also various instructions to start, interrupt and stop the print process and to change specifics of the print process. In accordance with the individual instructions, the job management unit 110 executes, for example, the function of sending instructions for changing individual processes of the print job to the corresponding devices in the color MFP 37, and the function of notifying the status of the print job under execution of the color MFP 37 to the corresponding devices in the color MFP 37.

While the above description is made, for example, in connection with the color MFP 37 having a plurality of functions, such as the copy function, the print function, and the finishing function, the image forming apparatus is not always required to have those functions. As another example, an image forming apparatus having the print function and the finishing function, or an image forming apparatus having only the print function can also be used. Further, a plurality of image forming apparatuses can be installed regardless of types. In that case, a plurality of image forming apparatuses can be each installed one for each of different types. Anyway, the image forming apparatus is not limited to a particular construction so long as the image forming apparatus is able to realize control executed in accordance with flowcharts described below.

Figure 12:
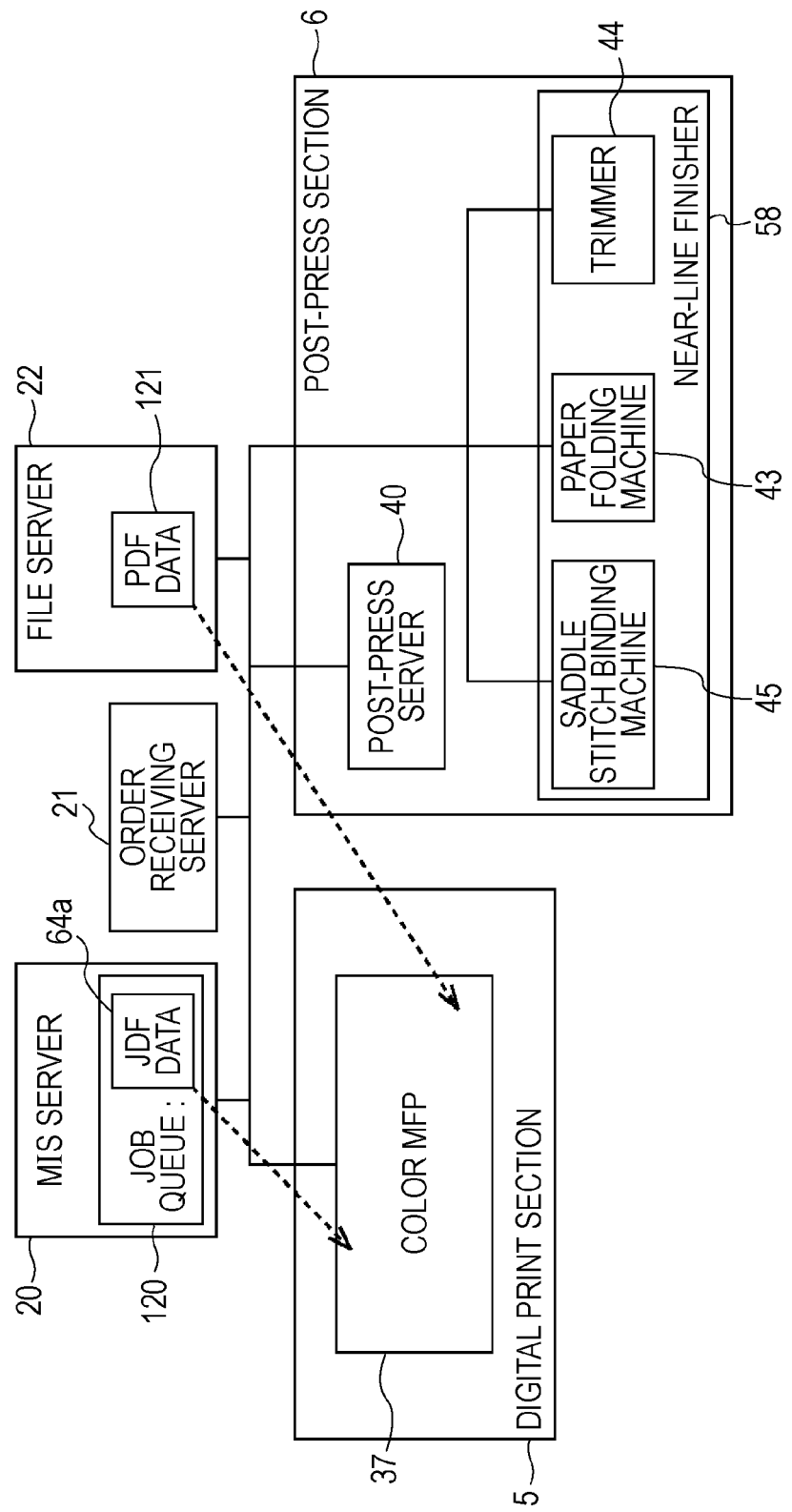
FIG. 12 represents the first exemplary embodiment of the present invention and conceptually illustrates an example of a process in which the digital print section receives a print job from a step management section for the first time.

FIG. 12 conceptually illustrates an example of a process in which the digital print section 5 receives a print job from the step management section 4 for the first time. The MIS server 20 holds a job process schedule in the POD system. In consideration of the delivery date and the delivery deadline of the print job and the operation schedule of the POD system, an administrator of the POD system previously sets which part of the print job is to be processed from what time to what time by using which device. Alternatively, the MIS server 20 can automatically generate the operation schedule of the POD system.

Jobs (tasks) to be processed by the color MFP 37 are based on information described in the JDF data 64*a*, and the JDF data 64*a* is generated by the MIS server 20. Further, in this exemplary embodiment, it is assumed that print contents data (e.g., PDF data) 121 to be actually processed is recorded in the file server 22. The JDF data 64*a* and the print contents data 121 are generated based on data regarding a print order sent from a customer (i.e., the print job 50). Because a process of generating the JDF data 64*a* and the print contents data 121 can be executed in a similar manner to that ordinarily performed in the commercial printing industry, a detailed description of such a process is omitted.

The MIS server 20 has a job queue 120 and sets, in the job queue 120, the JDF data 64*a* which is at time to start processing in accordance with the schedule. Further, the MIS server 20 sends the JDF data 64*a* to the color MFP 37 in the digital print section 5 from the job queue 120 in accordance with the schedule.

In this exemplary embodiment, as mentioned above, the print contents data 121 is recorded in the file server 22. It is also assumed that the color MFP 37 having received the JDF data 64*a* interprets the JDF data 64*a* to thereby recognize the print contents data 121 corresponding to the JDF data 64*a*, and then receives the relevant print contents data 121 from the file server 22. Because the print contents data 121 is data to be drawn on a recording medium, it is also called drawing data.

Figure 13:
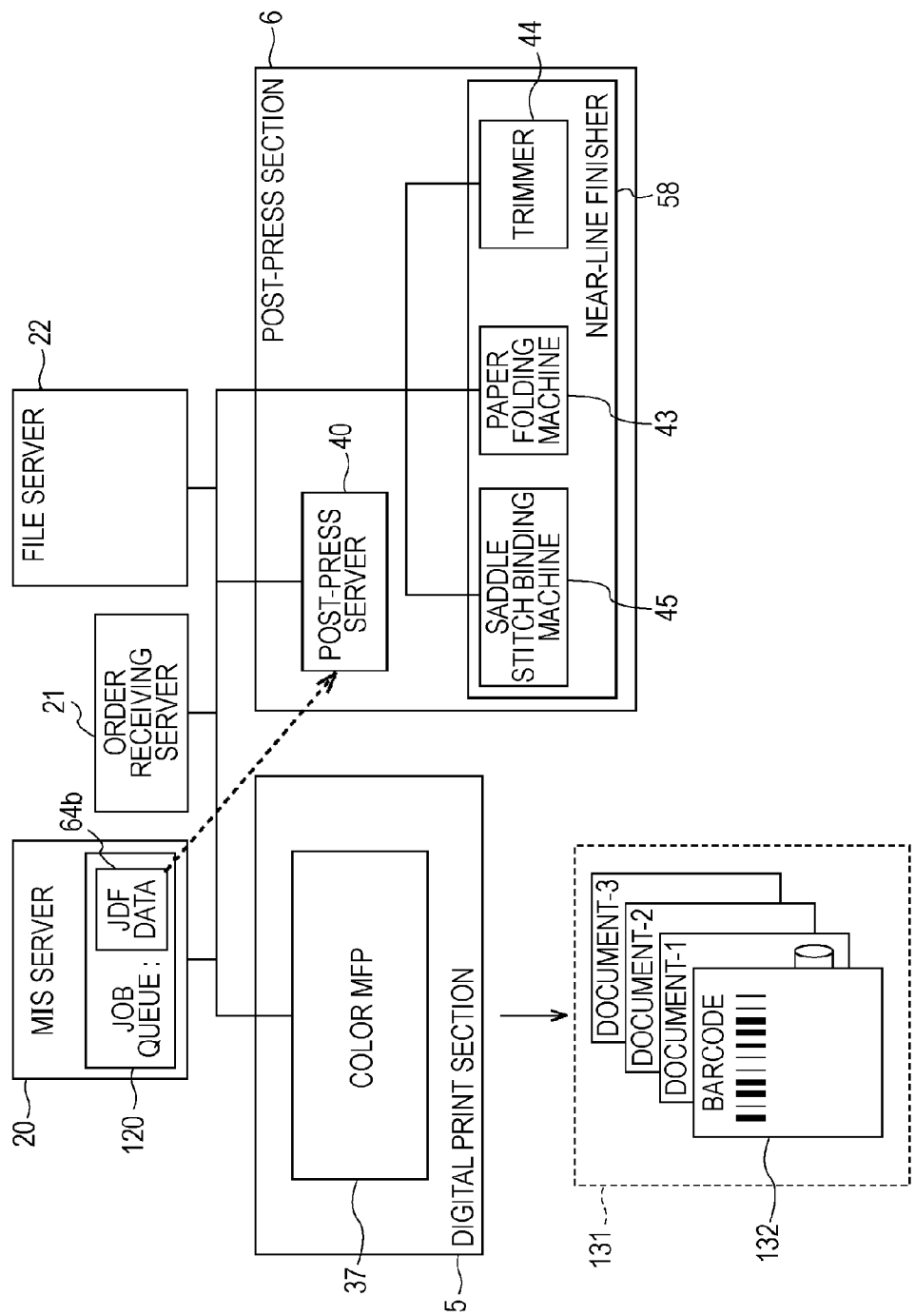
FIG. 13 represents the first exemplary embodiment of the present invention and conceptually illustrates an example of a process in which the post-press section receives a print job from the step management section for the first time.

FIG. 13 conceptually illustrates an example of a process in which the post-press section 6 receives a print job from the step management section 4 for the first time. Upon recognizing, for example, that it is time to start processing in accordance with the schedule, the MIS server 20 sends, to the post-press server 40, JDF data 64*b* that has been set in the job queue 120 to be processed by the near-line finisher 58. The JDF data 64*b* sent at that time is described in detail later with reference to FIGS. 14A and 14B.

Print documents 131 are output from the color MFP 37 and are subjected to the post-processing (finishing) in the near-line finisher 58. A job ticket 132 is provided in the form of paper sheet as one example of physical media and is output at a position easily recognizable by the operator, e.g., a position of a top sheet in the print documents 131. Information for specifying the JDF data 64*b*, e.g., identifier information (barcode), is described on the job ticket 132. The print documents 131 include, in addition to the job ticket 132, a print document body (i.e., individual pages) having been printed out in accordance with the print contents data 121 and the JDF data 64.

The identifier information (barcode) described on the job ticket 132 serves to correlate the JDF data 64*b* sent to the post-press server 40 via the network 8 with the contents of the JDF data 64*b* (i.e., the print documents 131). When the post-processing is started by the near-line finisher 58, the operator first causes the near-line finisher 58 to recognize the identifier information (barcode) described on the job ticket 132. Upon recognizing the identifier information (barcode), the near-line finisher 58 can correlate the print documents 131 to be subjected to the post-processing with the JDF data 64*b* received by the post-press server 40 from the MIS server 20. As a result, after the operator simply sets the print documents 131 in the near-line finisher 58, the near-line finisher 58 starts to execute the post-processing in accordance with a job instruction described in the JDF data 64*b*.

Figure 14A:
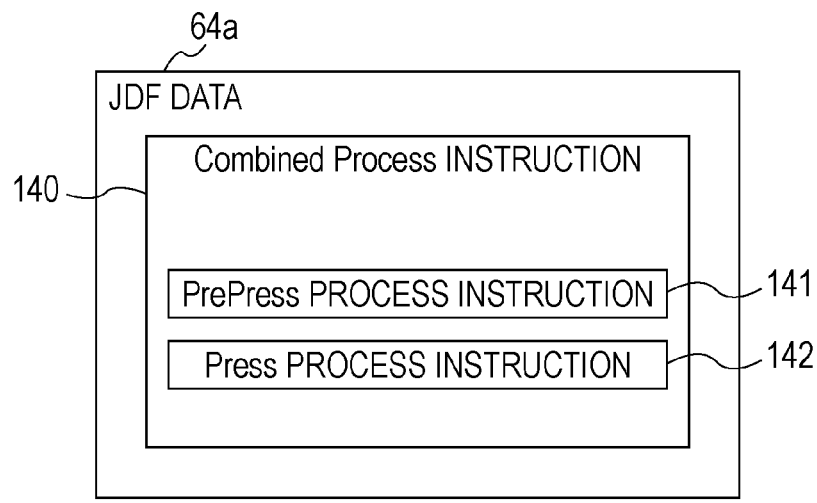
FIGS. 14A and 14B each represent the first exemplary embodiment of the present invention and illustrate an example of JDF data sent from an MIS (Management Information Service) server to the color MFP and JDF data sent from the MIS server to a post-press server.
Figure 14B:
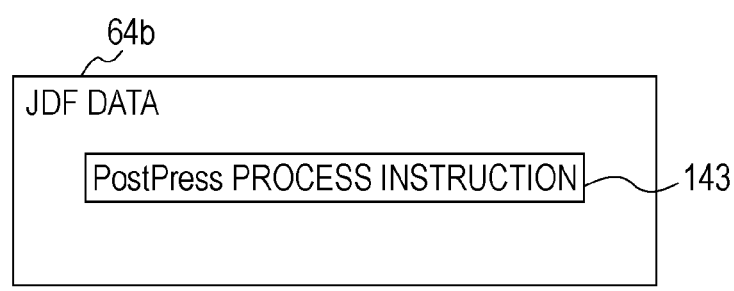

FIGS. 14A and 14B each illustrate an example of the JDF data 64*a* sent from the MIS server 20 to the color MFP 37 and the JDF data 64*b* sent from the MIS server 20 to the post-press server 40.

In FIG. 14A, a PrePress process instruction 141 included in the JDF data 64*a* is an instruction used when the PrePress process is executed, and a Press process instruction 142 included in the JDF data 64*a* is an instruction used when the Press process is executed. Those two instructions 141 and 142 are described as a Combined Process 140.

On the other hand, in FIG. 14B, a PostPress process instruction 143 included in the JDF data 64*b* is an instruction used when the PostPress process is executed. The PostPress process instruction 143 is executed by the near-line finisher 58 through the post-press server 40. By referring to the job instruction described in the JDF data 64*b*, the post-press server 40 recognizes that the process indicated by the Post-Press process instruction 143 is not yet completed. Also, by referring to the job instruction described in the JDF data 64b, the post-press server 40 can determine which one of the near-line finishers 58 is to be employed to execute the process indicated by the PostPress process instruction 143.

Figure 15:
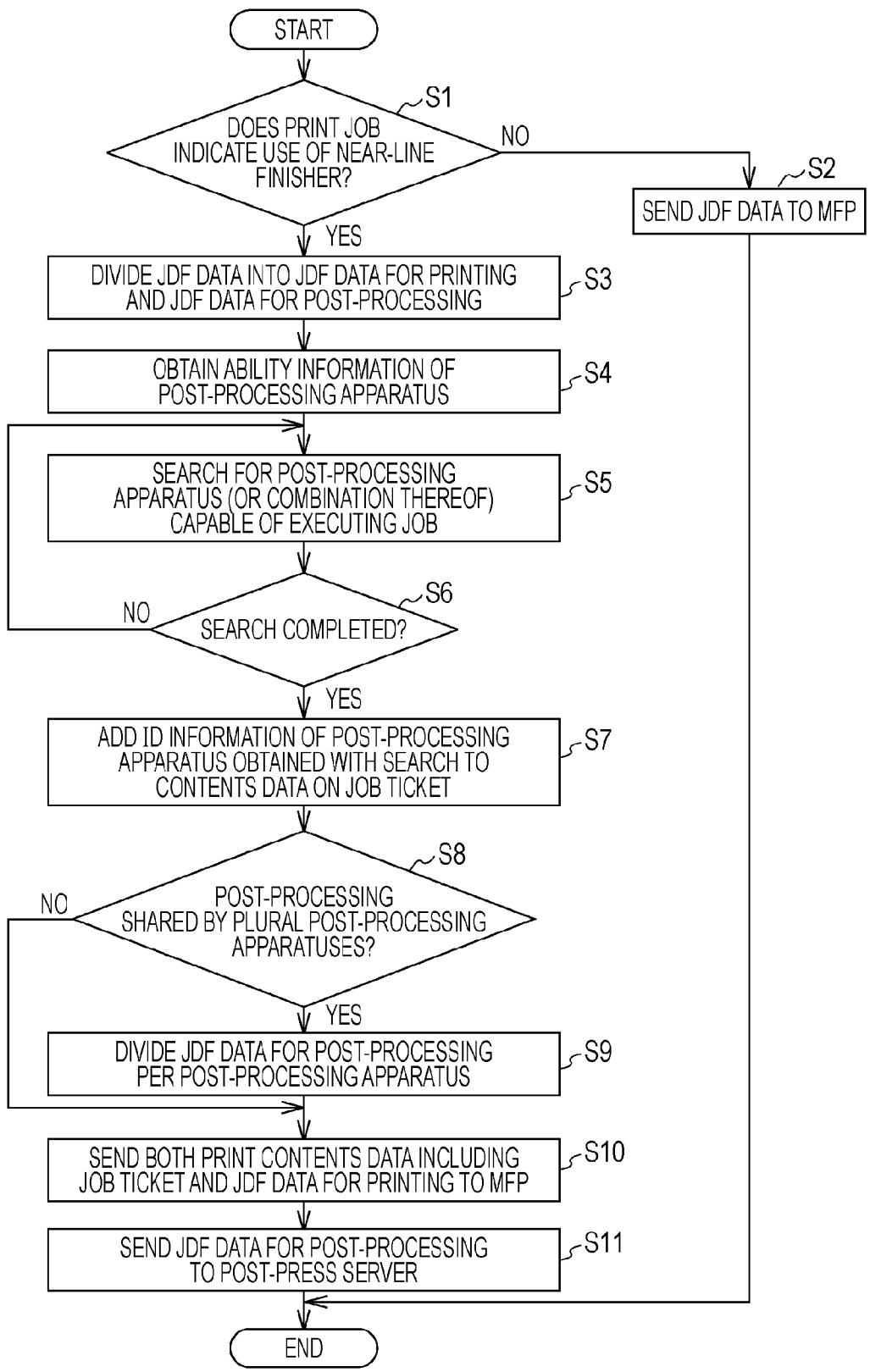
FIG. 15 represents the first exemplary embodiment of the present invention and is a flowchart illustrating an example of operations of the POD system when contents data of the job ticket is generated from the JDF data and both the JDF data and the print contents data are sent to the color MFP and the post-press server.

FIG. 15 is a flowchart illustrating an example of operations of the POD system when contents data of the job ticket 132 is generated from the JDF data 64 and both the JDF data 64 and the print contents data 121 are sent to the color MFP 37 and the post-press server 40. In this exemplary embodiment, successive steps of the flowchart in FIG. 15 are basically executed by the CPU 2401 in FIG. 24.

The following description is made for an example in which a print job executes, as the PostPress process, a bookbinding process (folding step) and a cutting process (trimming step). However, the JDF data 64 (print job) is not limited to such an example and the print job can be set so as to execute any type of PostPress process. Further, details of the PrePress process and the Press process are also not limited to particular ones.

First, in step S1, the MIS server 20 obtains the JDF data 64 according to the ordered job 50, which has been received from one of the end user environments 1 and 2 through the order receiving server 21. Then, the MIS server 20 determines whether the PostPress process instruction instructing the use of the near-line finisher 58 is included in the obtained JDF data 64. While the MIS server 20 generates the JDF data in this exemplary embodiment, the arrangement can be modified such that the MIS server 20 receives the JDF data 64 generated by, e.g., the order receiving server 21.

If the determination result in step S1 indicates that the PostPress process instruction instructing the use of the near-line finisher 58 is not included in the JDF data 64, the MIS server 20 advances to step S2. In step S2, the MIS server 20 sends the JDF data 64 to the color MFP 37.

As described above, the JDF data 64 received by the color MFP 37 is interpreted by the job analyzing portion 115. The color MFP 37 recognizes the print contents data 121, i.e., a processing target, as a result of interpreting the JDF data 64, and then receives the recognized print contents data 121 from the file server 22. Upon receiving the print contents data 121, the color MFP 37 starts the processing therein. While the print contents data 121 is sent from the file server 22 in this exemplary embodiment, the arrangement can be modified such that the print contents data 121 is sent from the MIS server 20 along with the JDF data 64.

If it is determined in step S1 that the PostPress process instruction instructing the use of the near-line finisher 58 is included in the JDF data 64, the MIS server 20 advances to step S3. In step S3, the MIS server 20 divides the received JDF data 64 into the JDF data 64a for the printing, which is to be sent to the color MFP 37, and the JDF data 64b for the post-processing, which is to be sent to the post-press server 40.

Next, in step S4, the MIS server 20 obtains ability information indicating what kinds of post-processing steps can be performed by the post-processing apparatuses, i.e., the near-line finishers 58, which are connected to the step management section 4 via the network 8. The term "ability information" implies, for example, the performance, the processing status, the connection status, and the schedule information of each near-line finisher 58. The ability information is managed in a storage unit of the MIS server 20. Herein, the ability information is assumed to indicate that the saddle stitch binding machine 45 can perform the folding step and the trimming step, that the paper folding machine 43 can perform the folding step, and that the trimmer 44 can perform the trimming step. The MIS server 20 obtains the ability information from the near-line finisher 58 or the post-press server 40.

Thus, in this exemplary embodiment, one example of post-processing ability information is provided by the above-described ability information, and one example of an ability ascertaining function is realized by executing the processing of step S4.

Next, in step S5, the MIS server 20 searches for one or more post-processing apparatuses as the near-line finishers 58, which are to be used in the post-processing, based on both the ability information obtained in step S4 and the PostPress process instruction described in the JDF data 64. Details of step S5 will be described later with reference to FIG. 16. It is here assumed that the PostPress process instruction described in the JDF data 64 includes the folding step and the trimming step. Therefore, it is determined that the near-line finisher 58 capable of performing those post-processing steps is provided by the saddle stitch binding machine 45, or a combination of the paper folding machine 43 and the trimmer 44. Thus, in this exemplary embodiment, one example of post-processing information is provided as the information indicating specifics of the PostPress process instruction described in the JDF data 64.

Next, in step S6, the MIS server 20 determines whether the post-processing apparatuses (or combinations thereof), which can execute post-processing jobs (i.e., which have abilities enough to execute jobs requested in the post-processing), have been all found through the search. If the determination result in step S6 indicates that the search for all those post-processing apparatuses (or all combinations thereof) is not yet been completed, the MIS server 20 returns to step S5 and repeats steps S5 and S6 until the search is completed.

After searching for all the post-processing apparatuses (or all combinations thereof) which can execute the post-processing in the ordered job, the processing advances to step S7. In step S7, the file server 22 adds identifier information of the post-processing apparatuses (i.e., the near-line finishers 58), which can execute the post-processing in the ordered job, to job contents data on the job ticket 132, the added identifier information being obtained with the search executed in steps S5 and S6.

Next, in step S8, the MIS server 20 determines whether the contents data on the job ticket 132, which has been prepared in step S7, includes the post-processing information indicating a combination of plural post-processing apparatuses. Stated another way, when the post-processing in the print job is executed by using one or more post-processing apparatuses other than that employed by the operator, the MIS server 20 determines whether the post-processing can be executed without sharing the post-processing by plural post-processing apparatuses.

If the determination result indicates that the contents data on the job ticket 132 includes the post-processing information indicating a combination of the plural post-processing apparatuses, the MIS server 20 advances to step S9. In step S9, the MIS server 20 divides the JDF data 64b for the post-processing into plural sets of data to be adapted for respective abilities of the individual post-processing apparatuses. The plural sets of JDF data divided in step S9 will be described in detail below with reference to FIGS. 17A and 17B.

Thus, in this exemplary embodiment, one example of information instructing the post-processing is provided as the JDF data for the post-processing, and one example of a dividing function is realized by executing the processing of step S9.

If the determination result indicates that the contents data on the job ticket 132 does not include the post-processing information indicating a combination of the plural post-processing apparatuses, this implies that the print job is executed by a single post-processing apparatus and the processing of S9 is not required. Therefore, the MIS server 20 skips step S9 and advances to step S10.

In step S10, the MIS server 20 sends the JDF data 64a for the printing to the color MFP 37.

As described above, the JDF data 64a received by the color MFP 37 is interpreted by the job analyzing portion 115. As a result of interpreting the JDF data 64, the color MFP 37 recognizes and receives the print contents data 121, i.e., a processing target, from the file server 22. Upon receiving the print contents data 121, the color MFP 37 starts the processing therein. At that time, the print contents data 121 received by the color MFP 37 includes the contents data on the job ticket 132. Further, the contents data on the job ticket 132 includes the identifier information (barcode) of each post-processing apparatus, which has been added in step S7. The identifier information includes the ID number of the print job, which is set in relation to the ID number of the print job executed in the post-processing.

Thus, in this exemplary embodiment, one example of a presenting function is realized by executing the processing of step S10.

Next, in step S11, the MIS server 20 sends the JDF data 64b for the post-processing to the post-press server 40.

Thus, in this exemplary embodiment, one example of an outputting function is realized by executing the processing of step S1.

FIG. 16 is a flowchart illustrating an example of details of the processing executed in step S5 of FIG. 15.

First, in step S20, the MIS server 20 determines whether there is a single post-processing apparatus capable of executing the post-processing steps of the ordered job 50 by alone. If the determination result indicates that there is a single post-processing apparatus capable of executing the post-processing steps of the ordered job 50 by alone, the MIS server 20 advances to step S24. In step S24, the MIS server 20 obtains information of the single post-processing apparatus from the relevant post-processing apparatus or the post-press server 40, and sends the obtained information to the file server 22, etc. Further, the MIS server 20 repeatedly executes the processing of step S20 to check the ability of other one or more post-processing apparatuses. In this exemplary embodiment, the saddle stitch binding machine 45 is present as the post-processing apparatus capable of executing the folding step and the trimming step by alone. Accordingly, the MIS server 20 obtains information of the saddle stitch binding machine 45 in step S24 and then returns to step S20.

If the determination result in step S20 indicates that the post-processing apparatus capable of executing the post-processing steps of the ordered job 50 by alone does not remain for which information is not yet obtained in step S24, the MIS server 20 advances to step S21.

In step S21, the MIS server 20 determines whether the post-processing steps of the ordered job 50 can be divided into N groups. It is here assumed that N is called a "division coefficient" and an initial value of the division coefficient N is "2".

If the determination result in step S21 indicates that the post-processing steps of the ordered job 50 cannot be divided into N groups, the MIS server 20 judges that there is no more post-processing apparatus capable of executing the post-processing steps of the ordered job 50, thus bringing the processing of the flowchart in FIG. 16 to an end. On the other hand, if the determination result in step S21 indicates that the post-processing steps of the ordered job 50 can be divided into plural groups, the MIS server 20 advances to step S22.

In step S22, the MIS server 20 divides the post-processing steps into N groups. For example, when there are two post-processing steps A and B on the assumption that the division coefficient N is 2, the MIS server 20 divides the post-processing steps into two groups A and B and defines those groups as new post-processing jobs. If there are three post-processing steps A, B and C, those post-processing steps are divided into two groups (A+B) and C, A and (B+C), or (A+C) and B. In this exemplary embodiment, a search is performed with the post-processing steps divided into two groups, i.e., the folding step and the trimming step.

Next, in step S23, the MIS server 20 determines whether, for each of the groups divided in step S22, there is a post-processing apparatus capable of executing the post-processing step that belongs to the relevant group.

If, for each of all the groups divided in step S22, there is a post-processing apparatus capable of executing the post-processing step that belongs to the relevant group, this implies that the post-processing steps of the ordered job 50 can be executed by using those post-processing apparatuses in a combined manner. In step S25, therefore, the MIS server 20 obtains information of each of those post-processing apparatuses from the relevant post-processing apparatus or the post-press server 40, and sends the obtained information to the file server 22, etc. The MIS server 20 then advances to step S27. In this exemplary embodiment, the folding step can be executed by the paper folding machine 42, and the trimming step can be executed by the trimmer 44. Hence, the MIS server 20 determines that the entire post-processing steps of the ordered job 50 can be executed by using the paper folding machine 42 and the trimmer 44 in a combined manner. Then, the MIS server 20 obtains information of both the paper folding machine 42 and the trimmer 44.

On the other hand, if, for any one of the groups divided in step S22, there is not a post-processing apparatus capable of executing the post-processing step that belongs to the relevant group, this implies that a combination of the post-processing apparatuses, which can execute the entire post-processing steps of the ordered job 50 does not exist. In step S26, therefore, the MIS server 20 sends, to the file server 22, etc., information indicating that the post-processing apparatuses having the necessary abilities are not present. Thereafter, the MIS server 20 advances to step S27.

In step S27, the MIS server 20 adds "1" to the value of the division coefficient N and then returns to step S21. Stated another way, after completing the search for the combination of the post-processing apparatuses having the necessary abilities with the post-processing steps divided into two groups, a similar search is executed with the post-processing steps divided into three groups. Further, after completing the search for the combination of the post-processing apparatuses having the necessary abilities with the post-processing steps divided into three groups, a similar search is executed with the post-processing steps divided into four groups. The processing of steps S21 to S27 is repeated until the post-processing steps cannot be divided any more (i.e., until a search process is completed).

Thus, in this exemplary embodiment, one example of a searching function is realized by executing the processing of the flowchart in FIG. 16 (i.e., step S5 of FIG. 15).

In FIG. 16, the post-processing apparatuses capable of executing the post-processing steps of the ordered job are searched for by setting the division coefficient N and executing the search with priority given to a combination of the post-processing apparatuses, which requires a minimum number of apparatuses to execute the post-processing steps. However, the search process is not necessarily limited to the above-described process so long as priority is allocated based on a certain determination criterion and a combination of the post-processing apparatuses having the necessary abilities is searched for in descending order of the priority.

Figure 17A:
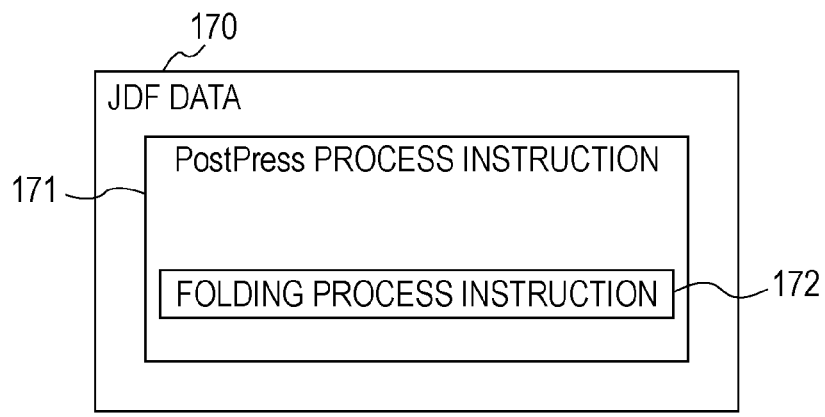
FIGS. 17A and 17B each represent the first exemplary embodiment of the present invention and illustrate an example of JDF data divided in step S9 of FIG. 15.
Figure 17B:
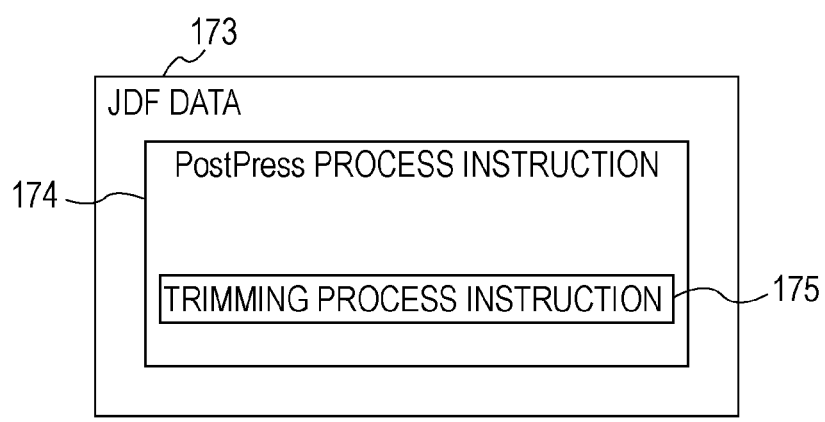

FIGS. 17A and 17B each illustrate an example of JDF data divided in step S9 of FIG. 15. In FIG. 17A, a PostPress process instruction 171 included in JDF data 170 for the post-processing is an instruction used when the PostPress process is executed by the paper folding machine 43, and the PostPress process instruction 171 includes a folding process instruction 172. Also, a PostPress process instruction 174 included in JDF data 173 for the post-processing is an instruction used when the PostPress process is executed by the trimmer 44, and the PostPress process instruction 174 includes a trimming process instruction 175. Thus, in this exemplary embodiment, the JDF data 170 and 171 are generated such that each JDF data contains the process instruction adapted for the post-processing ability of the post-processing apparatus which has been found through the search. When the job ticket does not include the information indicating the use of plural post-processing apparatuses in the post-processing steps (i.e., if the processing goes through the flowchart of FIG. 16 without executing step S22 in FIG. 16), the processing subsequent to step S22 in FIG. 16 does not need to be executed. In such a case, therefore, the MIS server 20 generates the same JDF data as the JDF data 64b illustrated in FIG. 14.

FIG. 18 illustrates an example of the job ticket 132 output in this exemplary embodiment. As seen from FIG. 18, the job ticket 132 is an instruction sheet on which information of one or more near-line finishers 58 capable of executing the post-processing steps of the ordered job 50 is described. In more detail, the job ticket 132 includes information 181 (181a to 181c) of the post-processing apparatus capable of performing the post-processing. The information 181 of the post-processing apparatus capable of performing the post-processing further includes information 182 (182a to 182c) indicating the name of the post-processing apparatus capable of performing the post-processing, and identifier information 183 of the post-processing apparatus capable of performing the post-processing. Plural sets of the information 181 of the post-processing apparatuses capable of performing the post-processing are described in the descending order of priority based on a certain determination criterion.

The information 181 of the post-processing apparatus capable of performing the post-processing represents information of the near-line finisher 58 which can execute the post-processing steps of the ordered job 50 which has been received by the MIS server 20, and the information 181 is present in number corresponding to the number of post-processing apparatuses (in single or combined use), which have been found through the search in steps S20 and S23. As mentioned above, the information 181 of the post-processing apparatus capable of performing the post-processing includes the information 182 indicating the name of at least one post-processing apparatus, and the identifier information 183 corresponding to the relevant post-processing apparatus. When the post-processing can be executed by a combination of plural post-processing apparatuses, the post-processing apparatus that requires to be operated at an earlier timing is described at a position closer to the left side of the job ticket 132. By thus presenting the job ticket 132 to the operator with priority given to the information of each of the plural post-processing apparatuses, the operator can recognize that the post-processing steps need to be executed in order by successively using the post-processing apparatuses described at positions closer to the left side of the job ticket 132. It is, however, not always necessary that the post-processing apparatus that requires to be operated at an earlier timing is described at a position closer to the left side of the job ticket 132. In other words, layout of the matters described on the job ticket 132 is not limited to the illustrated one so long as the job ticket 132 enables the operator to recognize the order of the post-processing steps to be executed (i.e., the priority order thereof).

FIG. 19 illustrates an example of configuration of a management table for managing the post-processing apparatuses (in single or combined use) which can execute post-processing in an ordered job. The management table is held in the storage unit by the MIS server 20 after completion of the process of searching for one or more post-processing apparatuses (in single or combined use) which can execute the post-processing in the ordered job.

Referring to FIG. 19, a management table 190 holds, for each of the post-processing apparatuses capable of executing individual jobs, a post-processing apparatus name 191, a permission-of-use flag 192, and status information 193. In FIG. 19, the vertical axis (each row) represents a combination and the horizontal axis (each column) represents a step. Also, a region including cells of the management table 190, which belong to the same step, is called a step sequence table 194. The step sequence table 194 is present in number corresponding to a maximum number of post-processing apparatuses used. In this exemplary embodiment, because two post-processing apparatuses (i.e., the paper folding machine 42 and the trimmer 44) are used at the maximum, there are two step sequence tables 194. Further, a region including cells of the management table 190, which belong to the same combination, is called a combination table 195. The combination table 195 is present in number corresponding to the number of sets of the "information 181 of the post-processing apparatuses capable of performing the post-processing", which are described on the job ticket 132. In the example illustrated in FIG. 18, because three sets of the information 181 of the post-processing apparatuses capable of performing the post-processing are present, there are three combination tables 195.

The post-processing apparatus name 191 represents the name of the post-processing apparatus which is possibly used in one of the post-processing steps. The post-processing apparatus name 191 is obtained by directly copying the name of the post-processing apparatus included in the "information 181 of the post-processing apparatus capable of performing the post-processing", which is described on the job ticket 132, into the storage unit of the MIS server 20. The permission-of-use flag 192 is a flag indicating whether the use of the relevant post-processing apparatus is permitted or not. More specifically, when the permission-of-use flag 192 is turned "ON", the use of the relevant post-processing apparatus is permitted, and when it is turned "OFF", the use of the relevant post-processing apparatus is not permitted. The status information 193 indicates the status of the relevant post-processing apparatus. In more detail, when "NOT YET COMPLETED" is set, the status information 193 indicates that the relevant step is not yet executed, and when "COMPLETED" is set, the status information 193 indicates that the relevant step is already completed. With the MIS server 20 managing the permission-of-use flag 192 and the status information 193, even if the operator performs checking of the identifier information 183 in an erroneous sequence, the MIS server 20 can detect an error in the step sequence and can notify the operator of such an error in the step sequence. In other words, the MIS server 20 can detect the event that the operator instructs the start of the post-processing step, which is to be executed at a later timing, although the post-processing step to be executed at an earlier timing is not yet completed. Upon the detection, the MIS server 20 can inform the detected event to the operator by using an image, voices, a lamp, etc.

In some cases, when the operator performs checking of the identifier information 183 in an erroneous sequence, the post-processing apparatus identified by the identifier information 183 having been erroneously checked is a post-processing apparatus which can be used in the other combination set in the management table 190. In this exemplary embodiment, the MIS server 20 can continue the post-processing steps even in such a case by performing coordinate transform adapted for the step sequence.

FIG. 20 is a flowchart illustrating an example of processing executed by the MIS server 20 when the operator performs checking of the identifier information 183 described on the job ticket 132 for causing the post-processing apparatus to perform the post-processing.

First, in step S31, the operator scans (checks) the identifier information 183 (barcode) on the job ticket 132 by using a scanner that is installed in the finisher. Responsively, in step S32, the MIS server 20 obtains information representing in which one of the post-processing apparatuses the identifier information 183 (barcode) has been checked.

Next, in step S33, the MIS server 20 determines whether the step sequence table 194 in the management table 190, which is held in the storage unit, is in a searchable state (i.e., there is a searchable step). If the determination result in step S33 indicates that the step sequence table 194 is not in the searchable state, the MIS server 20 advances to step S37. In step S37, the MIS server 20 replies an "error" to the "post-processing apparatus as a check target", which can be specified by the information obtained in step S32, or to the post-press server 40. The checking process in accordance with the flowchart of FIG. 20 is then brought to an end.

On the other hand, if the step sequence table 194 is in a searchable state, the MIS server 20 advances to step S34. In step S34, the MIS server 20 searches for the post-processing apparatus as the check target from the step sequence table 194 which is under a search at that time. The search is executed based on the post-processing apparatus name 191 in the step sequence table 194.

Next, in step S35, the MIS server 20 determines whether the post-processing apparatus as the check target has been found from the step sequence table 194. If the determination result in step S35 indicates that the post-processing apparatus as the check target has not been found from the step sequence table 194, the MIS server 20 advances to step S36. In step S36, the MIS server 20 selects the step sequence table 194 for the next step. Then, the MIS server 20 returns to step S33 and repeats the processing of steps S33 to S36 until the post-processing apparatus as the check target is found from the step sequence table 194.

If the post-processing apparatus as the check target is not found at all from the step sequence table 194, the MIS server 20 advances to step S37 as described above. In step S37, the MIS server 20 replies an "error" to the post-processing apparatus as the check target" or to the post-press server 40. The checking process in accordance with the flowchart of FIG. 20 is then brought to an end. When the MIS server 20 advances to step S37, this implies that the post-processing apparatus going to be used by the operator is not included in the post-processing apparatuses described on the job ticket 132. In other words, the operator is going to execute the post-processing by using the post-processing apparatus which is not appropriate.

On the other hand, if the post-processing apparatus as the check target has been found in step S35 from the step sequence table 194, the MIS server 20 advances to step S38. In step S38, the MIS server 20 determines whether the permission-of-use flag 192 corresponding to the found post-processing apparatus is turned "ON". If the determination result in step S38 indicates that the permission-of-use flag 192 corresponding to the found post-processing apparatus is turned "OFF", the MIS server 20 advances to step S39. In step S39, the MIS server 20 determines that the post-processing in a combination differing from the combination in the management table 190, to which the found post-processing apparatus belongs, is under execution. Accordingly, the MIS server 20 selects another combination from the same step sequence table 194.

If the permission-of-use flag 192 corresponding to the found post-processing apparatus is turned "ON", the MIS server 20 advances to step S40.

In step S40, the MIS server 20 determines the status information 193 of the post-processing apparatus, which belongs to the same combination as that including the found post-processing apparatus and which is assigned to a step immediately preceding the step assigned with the found post-processing apparatus.

If the determination result in step S40 indicates that the status information 193 of the found post-processing apparatus in the immediately preceding step represents "NOT YET COMPLETED", the MIS server 20 advances to step S44. In step S44, the MIS server 20 replies an "error" to the post-processing apparatus as the check target or to the post-press server 40. The checking process in accordance with the flowchart of FIG. 20 is then brought to an end. Thus, if the MIS server 20 advances to step S44, this implies that the next step in the post-processing is going to be executed in spite of the immediately preceding step being not yet completed, i.e., that the step sequence is false.

On the other hand, the status information 193 of the found post-processing apparatus in the immediately preceding step represents "COMPLETED", or if there is no immediately preceding step assigned to the found post-processing apparatus, the MIS server 20 advances to step S41. In step S41, the MIS server 20 determines whether there is a change in the step sequence (execution sequence) of the post-processing described on the JDF data 170 and 173 for the post-processing. Herein, the presence of a change in the step sequence implies that, while the JDF data 170 and 173 instruct, e.g., the sequence of the folding step and the trimming step, the step sequence described on the job ticket 132 indicates the sequence of the trimming step and the folding step, which is reversal to the sequence instructed by the JDF data. Such a change in the step sequence occurs for the reason that, unlike the case of using the inline finisher 90, individual steps are executed by the apparatuses physically apart from each other and the post-processing can be executed even with a change in the step sequence when the near-line finisher 58 is used.

If the determination result in step S41 indicates that there is no change in the step sequence of the post-processing described on the JDF data 170 and 173 for the post-processing, the MIS server 20 skips step S42 and advances to step S43. If there is a change in the step sequence of the post-processing described on the JDF data 170 and 173 for the post-processing, the MIS server 20 advances to step S42.

In step S42, the MIS server 20 converts coordinate instruction parameters (e.g., coordinate values representing a folding position and a trimming position), which are described in the JDF data 170 and 173 for the post-processing, to the form adapted for the current step sequence. Details of step S42 will be described later with reference to FIGS. 21A to 21C. After step S42, the MIS server 20 advances to step S43.

Thus, in this exemplary embodiment, one example of a changing function is realized by executing the processing of step S42 in FIG. 20.

In step S43, the MIS server 20 sends the JDF data 170 and 173 for the post-processing to the post-processing apparatus as the check target through the post-press server 40. As a result, it is determined that which one of the combinations indicated by the "information 181 of the post-processing apparatus capable of performing the post-processing", described on the job ticket 132, is used to execute the post-processing.

Next, in step S45, the MIS server 20 turns "OFF" the permission-of-use flags 192 on the management table 190 held in the storage unit, which correspond to the other combinations of the post-processing apparatuses than that determined in step S43. With this processing, the MIS server 20 can detect an error in the step sequence because the permission-of-use flag 192 is turned "OFF" even if the relevant post-processing apparatus is going to be used in the step sequence for one of the combinations of the post-processing apparatuses, which are set in the information 181 indicating the post-processing apparatuses capable of executing the post-processing, other than that determined.

Figure 21A:
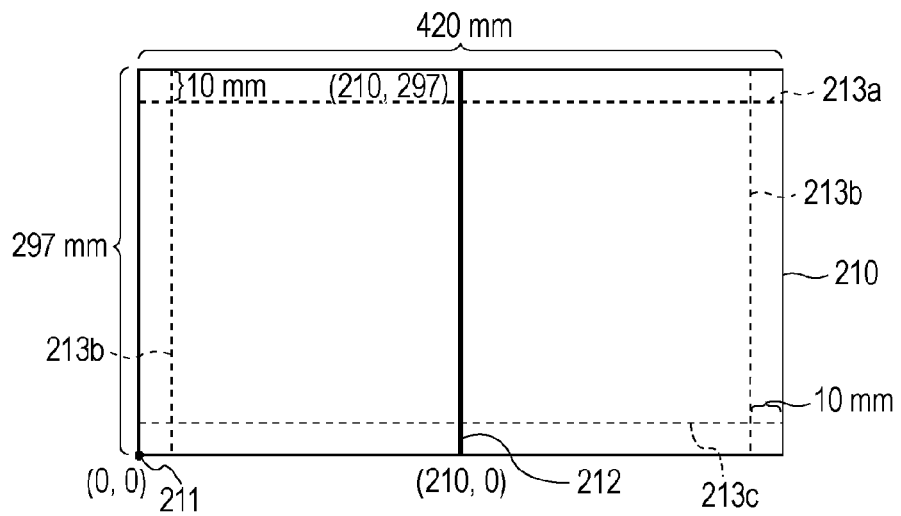
FIGS. 21A to 21C each represent the first exemplary embodiment of the present invention and conceptually illustrate an example of a process of, in step S42 of FIG. 20, converting coordinate instruction parameters, which are described in JDF data for the post-processing, to the form adapted for a current step sequence.
Figure 21B:
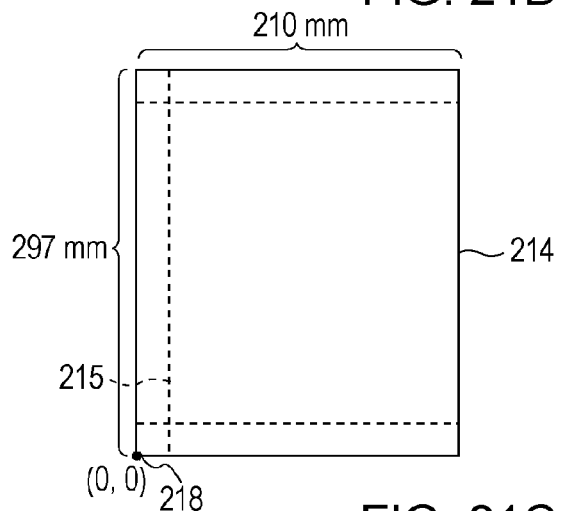
Figure 21C:
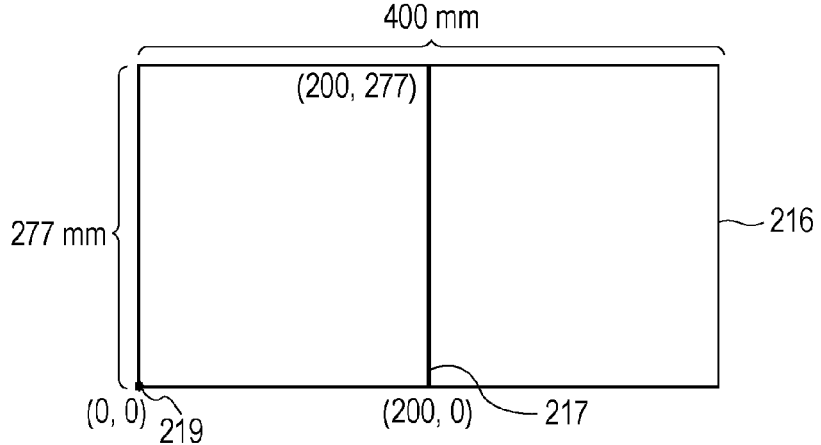

FIGS. 21A to 21C conceptually illustrate an example of a process of, in step S42 of FIG. 20, converting the coordinate instruction parameters, which are described in the JDF data 170 and 173 for the post-processing, to the form adapted for the current step sequence. In this exemplary embodiment, there are two executable processes, i.e., a process of executing the folding step and then the trimming step, and a process of executing the trimming step and then the folding step.

Referring to FIG. 21A, a sheet 210 is a print that has been printed by the color MFP 37. The sheet 210 is assumed to have an A4 size, i.e., a vertical length of 297 mm and a horizontal length of 420 mm. An origin 211 represents an origin for the sheet 210 and is expressed by coordinates (0, 0) (=(horizontal coordinate, vertical coordinate). A folding position 212 represents a position at which the folding step is performed. For example, when the sheet 210 is folded into two along a segment passing the folding position 212, the folding position 212 is provided by a position away 210 mm from the origin 211 in the horizontal direction. Coordinate parameters representing the coordinates of the folding position 212 are required to instruct the folding step.

A trimming position 213 represents a position at which the trimming step is performed. For example, when a peripheral portion of 10 mm of the sheet 210 is trimmed, four trimming positions 213a to 213d are provided by positions away 10 mm and 287 mm from the origin 211 in the horizontal direction and positions away 10 mm and 410 mm from the origin 211 in the vertical direction. Coordinate parameters representing the coordinates of those four trimming positions are required to instruct the trimming step.

Referring to FIG. 21B, a sheet 214 represents the print after folding the sheet 210 illustrated in FIG. 21A. The folded sheet 214 has a size with a vertical length of 297 mm and a horizontal length of 210 mm. In this case, a position away 10 mm from an origin 218 is designated as the trimming position 215 in the vertical direction.

Referring to FIG. 21C, a sheet 216 represents the print after trimming the sheet 210 illustrated in FIG. 21A. The trimmed sheet 216 has a size with a vertical length of 277 mm and a horizontal length of 400 mm. In this case, a position away 200 mm from an origin 219 is designated as a folding position 217 after the trimming step.

As described above, the coordinate parameters differ between the case of executing the post-processing in the sequence of the folding step and the trimming step and the case of executing the post-processing in the sequence of the trimming step and the folding step. In more detail, while the folding position is away 210 mm rightwards from the origin in FIG. 21B, the folding position is away 200 mm rightwards from the origin in FIG. 21C. Accordingly, the MIS server 20 converts, as mentioned above, the coordinate instruction parameters described in the JDF data 170 and 173 for the post-processing to coordinate parameters adapted for the step sequence.

Thus, in this exemplary embodiment, the MIS server 20 sends, to the color MFP 37, the job ticket 132 including the information of the plural post-processing apparatuses (in single or combined use), which have the abilities to execute the post-processing instructed by the print job, along with the print contents data. Accordingly, even when the other post-processing apparatus than the apparatus that has been initially scheduled by the operator to be used is actually used, the job ticket needs to be not output again. Therefore, time and efforts required for the operator can be reduced. Also, since the job ticket 132 includes the identifier information corresponding each of the post-processing apparatuses as the near-line finishers 58, it is possible to easily check the identifier information and the post-processing apparatus, and to prevent a mismatch as far as possible when the identifier information is checked. Hence, the relevant post-processing apparatus can be easily recognized. Further, when the post-processing cannot be executed by a single post-processing apparatus, a combination of plural post-processing apparatuses capable of executing the post-processing is searched for and information of the post-processing apparatuses found through the search is described on the job ticket 132 so that the operator can easily recognize the sequence in use of the post-processing apparatuses. Accordingly, even in the complicated post-processing using plural post-processing apparatuses, the operator can execute the post-processing steps without causing an error in the step sequence.

Still further, in this exemplary embodiment, the post-processing apparatuses (in single or combined use) capable of executing the post-processing in the ordered job are managed by using the management table 190. More specifically, the permission-of-use flag 192 corresponding to each of combinations other than the combination of the post-processing apparatuses actually used is turned "OFF". With such processing, the MIS server 20 can detect an error in the step sequence instructed by the operator because the permission-of-use flag 192 is turned "OFF" even when the relevant post-processing apparatus is going to be used in the step sequence for the other combination of the post-processing apparatuses than that actually used.

Moreover, in this exemplary embodiment, when the step sequence of the post-processing described in the JDF data 170 and 173 for the post-processing differs from the step sequence described on the job ticket 132, the coordinate instruction parameters in the JDF data for the post-processing are converted to the form adapted for the current step sequence. As a result, the JDF data for the post-processing can be flexibly changed and a burden imposed on the operator can be further reduced.

Second Exemplary Embodiment

A second exemplary embodiment of the present invention will be described below. The above-described first exemplary embodiment uses the job ticket 132 on which the information 181 of the post-processing apparatuses capable of executing the post-processing is described for plural apparatuses, the information 181 including the information 182 indicating the name of each post-processing apparatus capable of executing the post-processing and the identifier information 183 of the relevant post-processing apparatus capable of executing the post-processing. Therefore, even when the other post-processing apparatus than that initially scheduled is to be used after the job ticket 132 has been output, the post-processing in the print job can be executed without outputting the job ticket 132 again.

In this second exemplary embodiment, immediately before outputting of the job ticket, respective statuses of the post-processing apparatuses as the near-line finishers 58, which are connected to the step management section 4 via the network 8, are obtained to definitively confirm the post-processing apparatus usable in the post-processing and to generate the job ticket. Thus, this second exemplary embodiment differs from the first exemplary embodiment primarily in part of the manner for generating the job ticket. In the following, therefore, the same components as those in the first exemplary embodiment are denoted by the same reference numerals as those in FIGS. 1 to 21 and detailed descriptions of those components are omitted.

Figure 22:
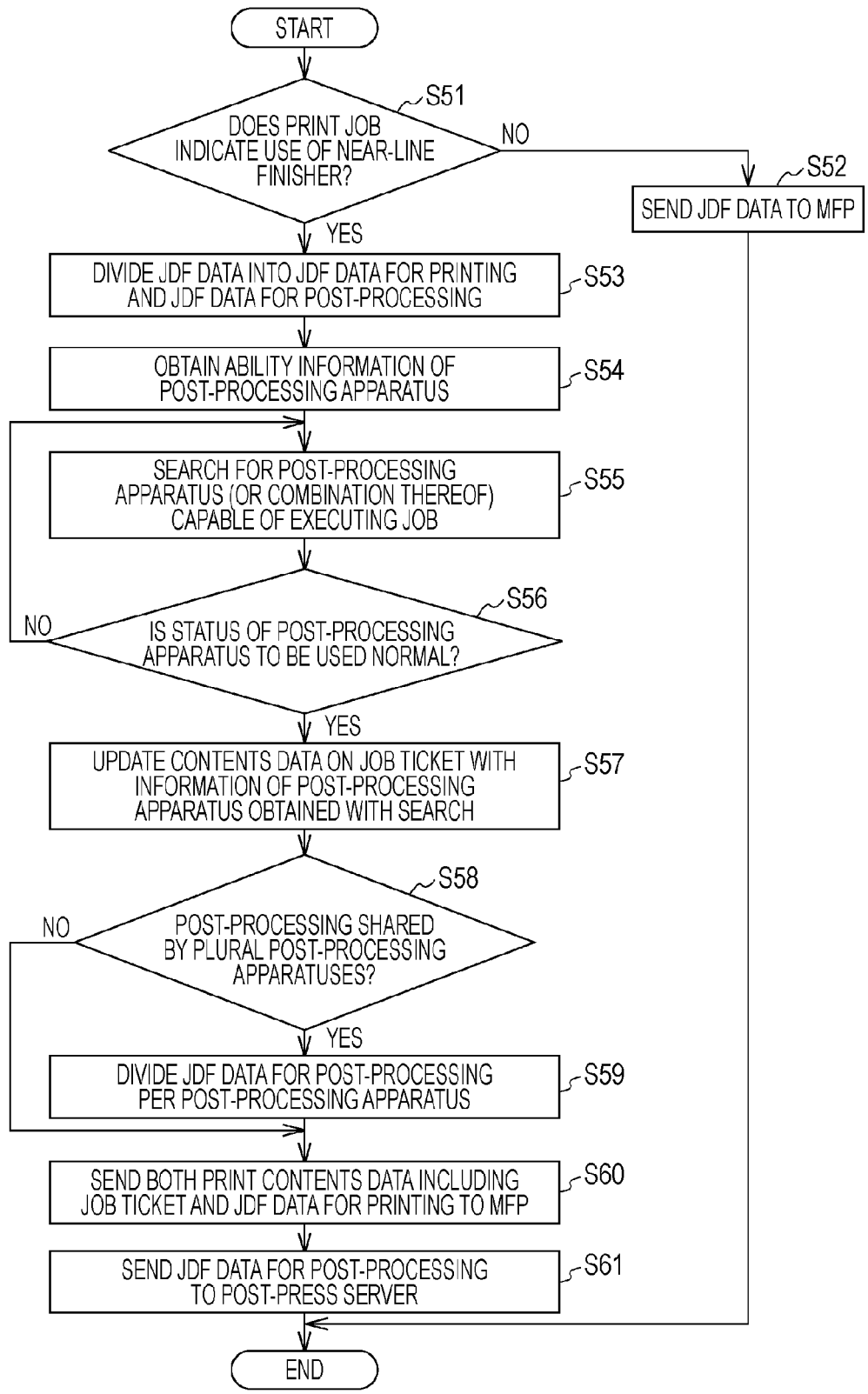
FIG. 22 represents a second exemplary embodiment of the present invention and is a flowchart illustrating an example of operations of the POD system when contents data of the job ticket is generated from the JDF data and both the JDF data and the print contents data are sent to the color MFP and the post-press server.

FIG. 22 is a flowchart illustrating an example of operations of the POD system when contents data of the job ticket 132 is generated from the JDF data 64 and both the JDF data 64 and the print contents data 121 are sent to the color MFP 37 and the post-press server 40. Also in this second exemplary embodiment, in step S51, the MIS server 20 first obtains the JDF data 64 according to the ordered job 50, which has been received from one of the end user environments 1 and 2 through the order receiving server 21. Then, the MIS server 20 determines whether the PostPress process instruction instructing the use of the near-line finisher 58 is included in the obtained JDF data 64.

If the determination result indicates that the PostPress process instruction instructing the use of the near-line finisher 58 is not included in the JDF data 64, the MIS server 20 advances to step S52. In step S52, the MIS server 20 sends the JDF data 64 to the color MFP 37.

If it is determined in step S51 that the PostPress process instruction instructing the use of the near-line finisher 58 is included in the JDF data 64, the MIS server 20 advances to step S53. In step S53, the MIS server 20 divides the received JDF data 64 into the JDF data 64a for the printing, which is to be sent to the color MFP 37, and the JDF data 64b for the post-processing, which is to be sent to the post-press server 40.

Next, in step S54, the MIS server 20 obtains ability information indicating what kinds of post-processing steps can be performed by the post-processing apparatuses as the near-line finishers 58, which are connected to the step management section 4 via the network 8.

Thus, in this second exemplary embodiment, one example of an ability ascertaining function is realized by executing the processing of step S54.

The above-described processing of steps S51 to S54 is the same as that of steps S1 to S4 in the first exemplary embodiment.

Next, in step S55, the MIS server 20 searches for which one or more of the post-processing apparatuses as the near-line finishers 58 can execute the post-processing in the print job, based on both the ability information obtained in step S54 and specifics of the PostPress process instruction described in the JDF data 64. In this step S55, the MIS server 20 basically executes the same processing as that described above with reference to FIG. 16 in the first exemplary embodiment. In this second exemplary embodiment, however, the MIS server 20 advances to processing of step S56 at a time when step S24 or step S25 has been executed once (i.e., when a set of one or more post-processing apparatuses (in single or combined use) capable of executing the post-processing in the ordered job have been found through the search). It is here assumed that the saddle stitch binding machine 45 is first found through the search.

Thus, in this second exemplary embodiment, one example of a searching function is realized by executing the processing of step S55.

Next, in step S56, the MIS server 20 obtains information regarding the current status of the set of one or more post-processing apparatuses (in single or combined use), which have been found through the search in step S55, from the relevant one or more post-processing apparatuses or the press server 40. The MIS server 20 then determines, based on the obtained information regarding the current status, whether the current status of the set of one or more post-processing apparatuses (in single or combined use), which have been found through the search in step S55, is normal.

Thus, in this second exemplary embodiment, one example of status information is realized with the information regarding the current status of the set of one or more post-processing apparatuses (in single or combined use), which have been found through the search in step S55. Also, one example of a status ascertaining function and a confirming function is realized by executing the processing of step S56.

If the determination result in step S56 indicates that the current status of the set of one or more post-processing apparatuses (in single or combined use), which have been found through the search in step S55, is not normal and the use of the set of one or more post-processing apparatuses is not permitted (i.e., if there occurs an error), the MIS server 20 returns to step S55 and searches for another set of one or more post-processing apparatuses (in single or combined use) which can execute the post-processing in the print job. The processing of steps S55 and S56 is repeated until the "set of one or more normal post-processing apparatuses (in single or combined use)", which can execute the post-processing in the print job, is found through the search.

If it is determined in step S56 that the current status of the set of one or more post-processing apparatuses (in single or combined use), which have been found through the search in step S55, is normal, the MIS server 20 advances to step S57.

In this second exemplary embodiment, as described above, after the current status of the set of one or more post-processing apparatuses, which have been found through the search in step S55, is determined to be normal and it is definitively confirmed that the relevant set of one or more post-processing apparatuses can be used, the contents data of the job ticket is generated. For example, if the saddle stitch binding machine 45 having been first found through the search is determined to be in a status not permitting the use thereof, the MIS server 20 returns to step S55 and searches for the combination of the paper folding machine 43 and the trimmer 44. Then, the MIS server 20 obtains respective current statuses of the paper folding machine 43 and the trimmer 44. If the current statues of the paper folding machine 43 and the trimmer 44 are all normal, the combination of the paper folding machine 43 and the trimmer 44 is described on the job ticket as the job contents data.

If the processing advances to step S57, the file server 22 updates the job contents data on the job ticket 132 with the information of the set of one or more post-processing apparatuses (i.e., the near-line finishers 58), capable of executing the post-processing in the ordered job, the updated information being obtained with the search in steps S55 and S56.

Thereafter, in steps S58 to S61, the MIS server 20 generates and sends the JDF data 64a for the printing and the JDF data 64b for the post-processing through similar processing to that executed in steps S8 to S11 of FIG. 15.

Figure 23:
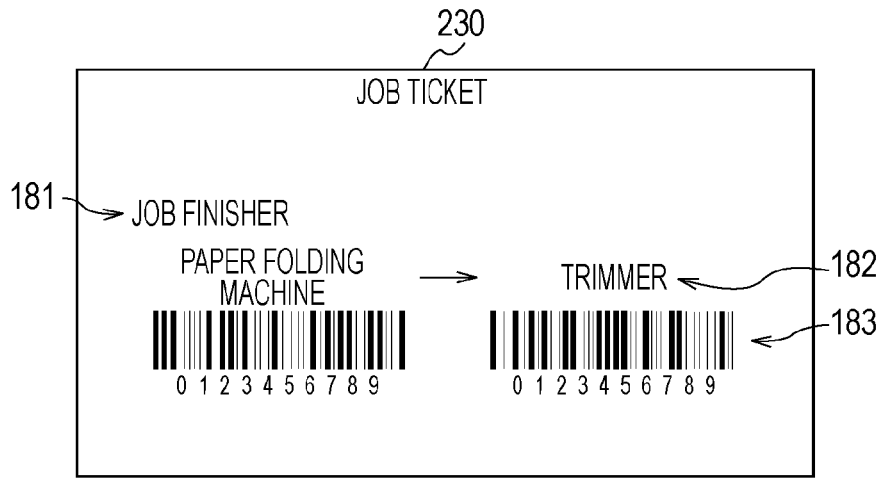
FIG. 23 represents the second exemplary embodiment of the present invention and illustrates an example of the job ticket.

FIG. 23 illustrates an example of the job ticket output in this second exemplary embodiment. Referring to FIG. 23, a job ticket 230 is an instruction sheet on which information of the set of one or more near-line finishers 58 capable of executing the post-processing steps of the ordered job 50 is described. More specifically, the job ticket 230 includes one set of information 181 of the post-processing apparatus(es) capable of performing the post-processing, specifically information 182 indicating the name(s) of the post-processing apparatus(es) capable of performing the post-processing and identifier information 183 of the post-processing apparatus(es) capable of performing the post-processing. The information included in the job ticket 230 is similar to that included in the job ticket 132, which has been described in the first exemplary embodiment (see FIG. 18). However, those two job tickets differ from each other in that, while plural sets of the information 181 of the post-processing apparatuses capable of performing the post-processing are described on the job ticket 132 in the first exemplary embodiment, only one set of the information 181 of the post-processing apparatus (es) capable of performing the post-processing is described on the job ticket 230 in the second exemplary embodiment.

Thus, in this second exemplary embodiment, only one set of information of the one or more post-processing apparatuses (in single or combined use), which can execute the post-processing instructed by the print job, is included in the job ticket 230 and is sent to the color MFP 37 along with the print contents data. Accordingly, a burden imposed on the operator can be further reduced.

While, in this second exemplary embodiment, only one set of information of the one or more post-processing apparatuses (in single or combined use), which can execute the post-processing instructed by the print job, is included in the job ticket 230, the present invention is not limited to such an example. If plural sets of information of the post-processing apparatuses (in single or combined use), which can execute the post-processing instructed by the print job, are found through the search according to the current statues of the post-processing apparatuses, the plural sets of information of those post-processing apparatuses can be included in the job ticket 230.

Modifications

The exemplary embodiments have been described above in connection with the configuration that each of the MFPs 33 to 37 includes the NIC unit 103. However, the NIC unit 103 can also be shared by the MFP and at least one of the MIS server 20, the order receiving server 21, the file server 22, the client PCs 1a, 1b, 23, 31, 32, 41 and 42, the print server 30, and the post-press server 40.

The exemplary embodiments have been described above in connection with the case where three types of processes, i.e., the PrePress process instruction, the Press process instruction, and the PostPress process instruction, are recorded in the JDF data. However, other one or more types of job steps can also be recorded in the JDF data. Further, in the PrePress process instruction, a plurality of job steps, such as a color conversion process and an imposing process, can also be recorded as internal processes. Similarly, a plurality of job steps can be recorded in each of the other process instructions (i.e., the Press process instruction and the PostPress process instruction).

The time of obtaining the ability information of the post-processing apparatus is not necessarily limited to the timings of step S4 in FIG. 15 and step S54 in FIG. 22. For example, the configuration can be modified such that the ability information of each post-processing apparatus is sent to the MIS server 20, for example, at the boot-up of the POD system or the startup of each post-processing apparatus or the post-press server 40, and the MIS server 20 manages the sent ability information.

With the exemplary embodiments of the present invention, plural sets of one or more post-processing apparatuses having abilities to execute the post-processing in the print job are searched for and presented to the operator. Accordingly, the operator can easily recognize the post-processing apparatuses having abilities to execute the post-processing in the print job, and a burden imposed on the operator taking in charge of performing the post-processing can be reduced.

Other Exemplary Embodiments of Present Invention

The units constituting the above-described print job management apparatus according to each of the exemplary embodiments of the present invention and the steps of the above-described print job management method can be realized with operations of programs stored in a RAM or a ROM of a computer. Therefore, those programs and a computer-readable recording medium recording those programs are involved within the scope of the present invention.

The present invention can be implemented in the forms of a system, an apparatus, a method, a program, a recording medium, etc. More specifically, the present invention can be applied to a system made up of plural units and to an apparatus constituted by one unit.

Practical embodiments of the present invention include the following case. Software programs (i.e., programs corresponding to the flowcharts illustrated in FIGS. 15, 16, 20 and 22 in the exemplary embodiments) for realizing the functions of the above-described exemplary embodiments are directly or remotely supplied to a system or an apparatus. Then, a computer incorporated in the system or the apparatus reads and executes the supplied programs (code thereof).

Accordingly, the program code installed in the computer to realize the functions and the processes of the present invention with the computer also constitutes a practical embodiment of the present invention. In other words, the program code for realizing the functions and the processes of the present invention is also included in the scope of the present invention.

On that occasion, the programs can have various forms, e.g., object code, programs executed by an interpreter, and script data supplied to the OS, so long as the functions required for the programs are satisfied.

The recording medium for supplying the programs can be, e.g., a floppy disk, a hard disk, an optical disk, a magneto-optical disk (MO), a CD-ROM, a CD-R, and a CD-RW. Other examples of the recording medium include a magnetic tape, a nonvolatile memory card, a ROM, and a DVD (DVD-ROM or DVD-R).

Further, the programs can be supplied through the steps of connecting a client computer to a homepage on the Internet through a browser in the client computer, and downloading the computer programs implementing the exemplary embodiment of the present invention in themselves or a file, which contains the computer programs in compressed form and which has an automatic installing function, to a recording medium, e.g., a hard disk, from the connected homepage.

As another method, the program code constituting the programs implementing the exemplary embodiment of the present invention can be divided into a plurality of files, and those files can be downloaded from different homepages. In other words, practical embodiments of the present invention include a WWW server for downloading, to a plurality of users, a program file which realizes the functions and the processes of the present invention with a computer.

Alternatively, the programs can be supplied as follows. The programs implementing the exemplary embodiment of the present invention are encrypted and stored in a storage medium, e.g., a CD-ROM, for distribution to users. The user who clears predetermined conditions is allowed to download key information necessary for decryption from a homepage via the Internet. The user decrypts and executes the encrypted programs by using the downloaded key information, thus installing the programs in a computer.

Practical embodiments of the present invention are not limited to the case that the functions of the above-described exemplary embodiments are realized with a computer executing the read programs. For example, the functions of the above-described exemplary embodiments can also be realized in such a manner that an OS, etc. operating on the computer executes a part or the whole of actual processing in accordance with instructions from the read programs.

The functions of the above-described exemplary embodiments can be further realized as follows. The programs read out from the recording medium are written in a function expansion board inserted in a computer or a memory incorporated in a function expansion unit connected to the computer. Then, a CPU or the like incorporated in the function expansion board or the function expansion unit executes a part or the whole of actual processing in accordance with instructions from the programs.

The above-described exemplary embodiments merely represent concrete examples when the present invention is put into practice, and they should not be interpreted in a way limiting the technical scope of the present invention. In other words, the present invention can be implemented in various forms without departing from the technical concept and the primary features of the present invention.

While the present invention has been described with reference to the exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-123896 filed May 9, 2008, which is hereby incorporated by reference herein in it's entirety.

What is claimed is:

1. A print job management apparatus comprising:
    an ability ascertaining unit configured to obtain post-processing ability information regarding an ability of a post-processing apparatus which executes post-processing for a printed sheet;
    a searching unit configured to, based on the post-processing ability information obtained by the ability ascertaining unit and post-processing information regarding specifics of the post-processing in a print job, search for a combination of a first and a second post-processing apparatus to execute the post-processing in the print job and for a third post-processing apparatus to singly execute the post-processing in the print job;
    a storage unit configured to store a processing sequence of the first and the second post-processing apparatuses in the combination;
    a generating unit configured to generate print data to print, on a single sheet, first identification information of the first post-processing apparatus and second identification information of the second post-processing apparatus in the combination and third identification information of the third post-processing apparatus;
    an obtaining unit configured to obtain target information representing the first post-processing apparatus in a case where the first post-processing apparatus reads at least one of the first, second, and third identification information printed on a sheet based on the print data; and
    an output unit configured to output error information to the first post-processing apparatus when it is determined that a sequence of the post-processing is improper based on the obtained target information and stored processing sequence.

2. The print job management apparatus according to claim 1, wherein the generating unit generates the print data to print the first and second identification information such that a user can recognize a sequence in use of the first and second post-processing apparatuses in the combination.

3. The print job management apparatus according to claim 1, further comprising:
    a dividing unit configured to, when the searching unit searches the first and second post-processing apparatuses as the combination, divide instruction information for the post-processing in the print job into plural sets depending on respective abilities of the first and second post-processing apparatuses,
    wherein the output unit outputs the plural sets of the instruction information divided by the dividing unit.

4. The print job management apparatus according to claim 1, further comprising:
    a status ascertaining unit configured to obtain status information regarding respective statuses of the post-processing apparatuses; and
    a confirming unit configured to confirm, based on the status information obtained by the status ascertaining unit, that the post-processing apparatuses found by the searching unit are normal.

5. The print job management apparatus according to claim 1, wherein the generating unit generates the print data to print a name of the post-processing apparatus and identifier information corresponding to the relevant post-processing apparatus.

6. The print job management apparatus according to claim 1, wherein the generating unit generates the print data to be printed where the first and second identification information is printed under the third identification information according to a priority order.

7. A print job management method comprising the steps of:
    obtaining post-processing ability information regarding an ability of a post-processing apparatus which executes post-processing for a printed sheet;
    searching for, based on the obtained post-processing ability information and post-processing information regarding specifics of the post-processing in a print job, a combination of a first and a second post-processing apparatus to execute the post-processing in the print job and for a third post-processing apparatus to singly execute the post-processing in the print job;
    storing a processing sequence of the first and the second post-processing apparatuses in the combination;
    generating print data to print, on a single sheet, first identification information of the first post-processing apparatus and second identification information of the second post-processing apparatus in the combination and third identification information of the third post-processing apparatus;
    obtaining target information representing the first post-processing apparatus in a case where the first post-processing apparatus reads at least one of the first, second, and third identification information printed on a sheet based on the print data; and outputting error information to the first post-processing apparatus when it is determined that a sequence of the post-processing is improper based on the obtained target information and stored processing sequence.

8. A non-transitory storage medium storing a program executed in a print job management apparatus, the program causing the print job management apparatus to perform the steps of:

obtaining post-processing ability information regarding an ability of a post-processing apparatus which executes post-processing for a printed sheet;

searching for, based on the obtained post-processing ability information and post-processing information regarding specifics of the post-processing in a print job, a combination of a first and a second post-processing apparatus to execute the post-processing in the print job and for a third post-processing apparatus to singly execute the post-processing in the print job;

storing a processing sequence of the first and the second post-processing apparatuses in the combination;

generating print data to print identification information of the first and second post-processing apparatuses in the combination and identification information of the third post-processing apparatus on a single sheet;

obtaining target information representing the first post-processing apparatus in a case where the first post-processing apparatus reads at least one of the first, second and third identification information printed on a sheet based on the print data; and outputting error information to the first post-processing apparatus when it is determined that a sequence of the post-processing is improper based on the obtained target information and stored processing sequence.

* * * * *